US007933349B2

(12) United States Patent
Kawauchi et al.

(10) Patent No.: US 7,933,349 B2
(45) Date of Patent: Apr. 26, 2011

(54) OFDM RECEIVER AND OFDM SIGNAL RECEIVING METHOD

(75) Inventors: Hidetoshi Kawauchi, Kanagawa (JP); Toshihisa Hyakudai, Chiba (JP)

(73) Assignee: Sony Corporation (JP)

( * ) Notice: Subject to any disclaimer, the term of this patent is extended or adjusted under 35 U.S.C. 154(b) by 838 days.

(21) Appl. No.: 11/900,403

(22) Filed: Sep. 10, 2007

(65) Prior Publication Data

US 2008/0101490 A1 May 1, 2008

(30) Foreign Application Priority Data

Sep. 12, 2006 (JP) ............................... P2006-247096

(51) Int. Cl.
*H04L 27/28* (2006.01)
(52) U.S. Cl. ........................ 375/260; 375/316
(58) Field of Classification Search .......... 375/259–260; 370/208–210
See application file for complete search history.

(56) References Cited

U.S. PATENT DOCUMENTS

| | | | | |
|---|---|---|---|---|
| 2003/0072395 | A1* | 4/2003 | Jia et al. ...................... | 375/341 |
| 2004/0228272 | A1* | 11/2004 | Hasegawa et al. ............ | 370/210 |
| 2007/0030798 | A1* | 2/2007 | Okada ......................... | 370/208 |
| 2007/0036232 | A1* | 2/2007 | Hayashi ....................... | 375/260 |
| 2009/0052564 | A1* | 2/2009 | Hayashi et al. ............... | 375/260 |
| 2009/0213948 | A1* | 8/2009 | Ma et al. ...................... | 375/260 |

OTHER PUBLICATIONS

Receiver for Digital Terrestrial Sound Broadcast standard (Desirable Specification), ARIB STD-B30, Association of Radio Industries and Businesses (2000).
Transmission System for Digital Terrestrial Sound Broadcasting, ARIB STD-B29, Association of Radio Industries and Businesses (1999).

* cited by examiner

*Primary Examiner* — Emmanuel Bayard
(74) *Attorney, Agent, or Firm* — Lerner, David, Littenberg, Krumholz & Mentlik, LLP

(57) ABSTRACT

An OFDM receiver may include OFDM-signal receiving means for receiving an orthogonal frequency division multiplexing signal, channel-characteristic estimating means for estimating a channel characteristic, time-direction-channel estimating means used for the estimation of a channel characteristic, judging means for judging a result of the estimation of a time direction channel, switching control means for switching presence or absence of the estimation of a time direction channel in accordance with a result of the judgment on the result of the estimation of a time direction channel, and transmission-distortion compensating means for applying processing for compensating for transmission distortion to the OFDM frequency domain signal received by the OFDM-signal receiving means and subjected to the Fast Fourier Transform.

18 Claims, 19 Drawing Sheets

RANGE OF 1/3
OF EFFECTIVE SYMBOL

JUDGE PRESENCE OR ABSENCE OF SHIFT OF MAIN PATH

CHECK POWER LEAKAGE OF MAIN PATH

JUDGE PRESENCE OR ABSENCE OF SHIFT OF ECHO

CHECK POWER LEAKAGE OF ECHO

FIG. 20
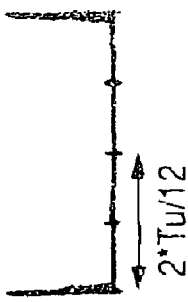
−Tu/12 SHIFT
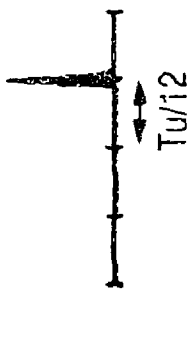
+Tu/12 SHIFT
2*Tu/12 SHIFT
POWER LEAKAGE TO POSITION OF +Tu/12, −Tu/12, 2*Tu/12
EXAMPLE IN THE CASE OF ONE WAVE

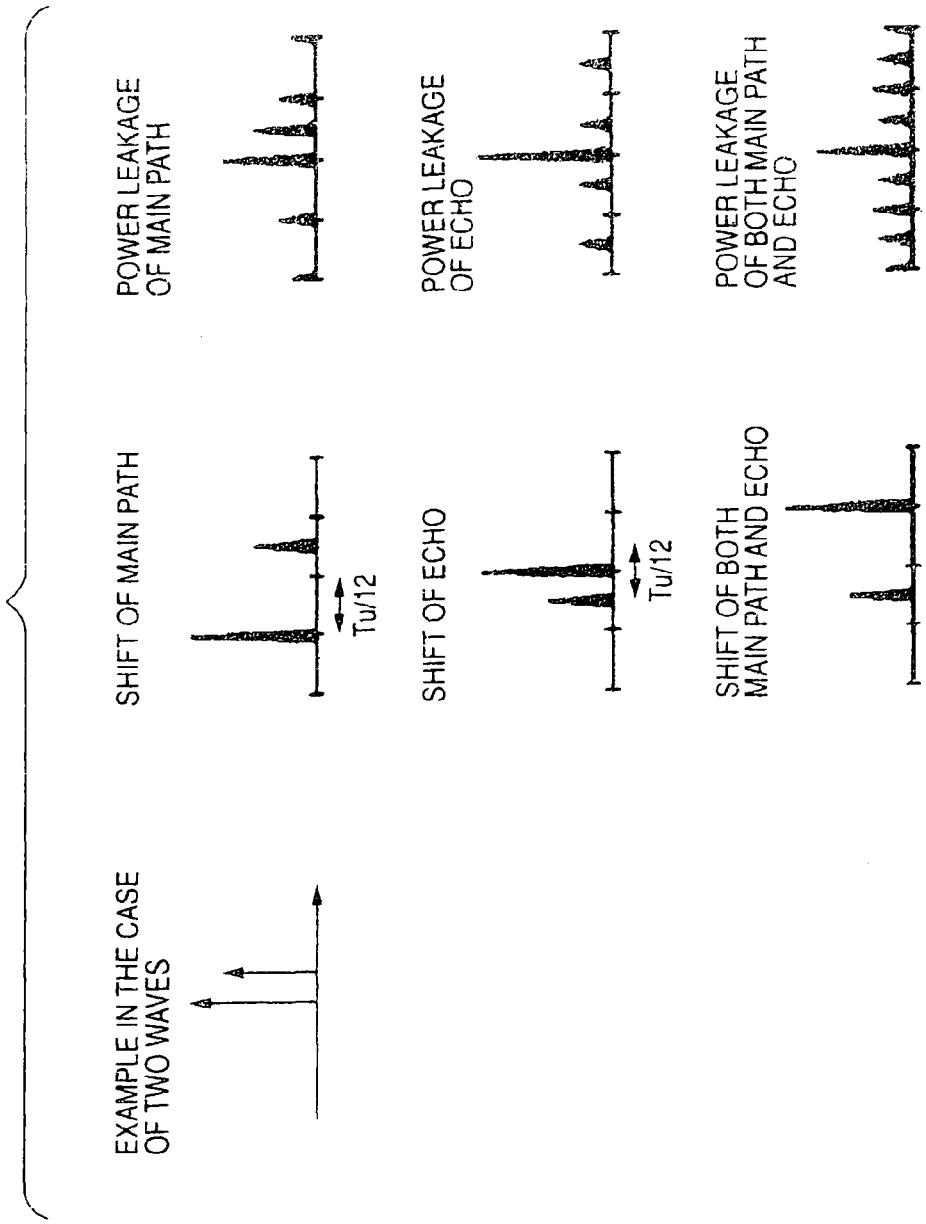

OFDM RECEIVER AND OFDM SIGNAL RECEIVING METHOD

CROSS-REFERENCE TO RELATED APPLICATIONS

This application claims priority from Japanese Patent Application No. JP 2006-247096 filed in the Japanese Patent Office on Sep. 12, 2006, the entire content of which is incorporated herein by reference.

BACKGROUND OF THE INVENTION

1. Field of the Invention

The present invention relates to an OFDM receiver and an OFDM signal receiving method for receiving an orthogonal frequency division multiplexing (OFDM) signal and demodulating the OFDM signal.

2. Description of the Related Art

A modulation system called an orthogonal frequency division multiplexing (OFDM) system is used as a modulation and demodulation system of a terrestrial digital broadcasting system. This OFDM system is a system for providing a large number of orthogonal sub-carriers in a transmission band, allocating data to amplitudes and phases of the respective sub-carriers, and digitally modulating a signal according to PSK (Phase Shift Keying) or QAM (Quadrature Amplitude Modulation).

The OFDM system has a characteristic that, since the transmission band is divided by the large number of sub-carriers, although a band per one sub-carrier is narrowed and modulation speed is reduced, transmission speed as a whole is the same as that in the modulation system in the past. The OFDM system also has a characteristic that, since the large number of sub-carriers are transmitted in parallel, symbol speed is reduced. Therefore, in the OFDM system, a time length of a multi-path relative to a time length of a symbol can be reduced and transmission is less susceptible to a multi-path interference. Further, the OFDM system has a characteristic that, since data is allocated to the plural sub-carriers, a transmission and reception circuit can be formed by using, during modulation, an IFFT (Inverse Fast Fourier Transform) arithmetic circuit that performs inverse Fourier transform and using, during demodulation, an FFT (Fast Fourier Transform) arithmetic circuit that performs Fourier transform.

Since the OFDM system has the characteristics described above, the OFDM system is often applied to the terrestrial digital broadcast that is intensely affected by the multi-path interference. As the terrestrial digital broadcast employing such an OFDM system, there are standards such as DVB-T (Digital Video Broadcasting-Terrestrial), ISDB-T (Integrated Services Digital Broadcasting-Terrestrial) and ISDB-TSB (Integrated Services Digital Broadcasting-Terrestrial Sound Broadcasting) (see, for example, "Receiver for Terrestrial Digital Sound Broadcast-Standard (Desirable Specifications) ARIB STD-B30 version 1.1", Association of Radio Industries and Businesses, decided on May 31, 2001 and revised on Mar. 28, 2002 and "Transmission System for Terrestrial Digital Sound Broadcast ARIB STD-B29 version 1.1", Association of Radio Industries and Businesses, decided on May 31, 2001 and revised on Mar. 28, 2002).

A transmission signal in the OFDM system is transmitted by a unit of a symbol called an OFDM symbol. This OFDM symbol includes an effective symbol that is a signal period in which IFFT is performed during transmission and a guard interval in which a waveform of a part of the latter half of this effective symbol is directly copied. This guard interval is provided in the former half of the OFDM symbol. In the OFDM system, such a guard interval is provided to improve multi-path resistance. Plural OFDM symbols are collected to form one OFDM transmission frame. For example, in the ISDB-T standard, one OFDM transmission frames are formed by two hundred four OFDM symbols. Insertion positions of pilot signals are set with this unit of OFDM transmission frames as a reference.

In the OFDM system in which the modulation of a QAM system is used as a modulation system for each of the sub-carriers, characteristics of the amplitude and the phase are different for each of the sub-carriers because of the influence of the multi-path and the like during transmission. Therefore, on a reception side, it is necessary to equalize a reception signal to make the amplitude and the phase for each of the sub-carriers equal. In the OFDM system, on a transmission side, pilot signals of a predetermined amplitude and a predetermined phase are discretely inserted in a transmission symbol in a transmission signal. On the reception side, a frequency characteristic of a channel is calculated using the amplitude and the phase of the pilot signals and a reception signal is equalized according to the calculated characteristic of the channel.

The pilot signals used for calculating a channel characteristic are referred to as scattered pilot (SP) signals.

A structure of a basic OFDM receiver of ISDB-T, which is the Japanese digital terrestrial broadcast standard, is shown in a block diagram in FIG. 17.

The OFDM receiver 100 includes an antenna 101, a tuner 102, a band-pass filter (BPF) 103, an A/D converter 104, a digital orthogonal demodulator 105, an FFT arithmetic circuit 106, a pilot-use channel estimator 107, a channel distortion compensator 108, an error correction circuit 109, a transmission-parameter decoder 110, a delay profile estimator 111, and a window regenerator 112.

A broadcast wave of a digital broadcast transmitted from a broadcasting station is received by the antenna 101 of the OFDM receiver 100 and supplied to the tuner 102 as an RF signal.

The tuner 102 includes a local oscillator 102b and a multiplication circuit 102a. The tuner 102 frequency-converts the RF signal received by the antenna 101 into an IF signal. The IF signal obtained by the tuner 102 is filtered by the band-pass filter (BPF) 103 and, then, digitized by the A/D converter 104 and supplied to the digital orthogonal demodulator 105.

The digital orthogonal demodulator 105 orthogonally demodulates the digitized IF signal using a carrier signal of a predetermined frequency (a carrier frequency) and outputs an OFDM signal of a baseband. The OFDM signal of the baseband outputted from the digital orthogonal demodulator 105 is a signal of a so-called time domain before being subjected to an FFT operation. Therefore, a baseband signal after the digital orthogonal demodulation and before being subjected to the FFT operation is hereinafter referred to as an OFDM time domain signal. As a result of orthogonal demodulation, this OFDM time domain signal changes to a complex signal including a real axis component (an I channel signal) and an imaginary axis component (a Q channel signal). The OFDM time domain signal outputted by the digital orthogonal demodulator 105 is supplied to the FFT arithmetic circuit 106, the window regenerator 112, and the delay profile estimator 111.

The FFT arithmetic circuit 106 applies the FFT operation to the OFDM time domain signal, extracts data orthogonally modulated in each of sub-carriers, and outputs the data. A signal outputted from the FFT arithmetic circuit 106 is a signal of a so-called frequency domain after being subjected to the FFT operation. Therefore, the signal after the FFT operation is referred to as an OFDM frequency domain signal.

The FFT arithmetic circuit 106 extracts a signal in a range of an effective symbol length from one OFDM symbol, i.e., excludes a range of a guard interval from one OFDM symbol, and applies the FFT operation to the extracted OFDM time domain signal. Specifically, a position where the arithmetic operation is started is any position from a boundary of the OFDM symbol to an end position of the guard interval. This arithmetic operation range is referred to as an FFT window.

In the OFDM receiver 100, the designation of this FFT window position is performed by the window regenerator 112. As the window regenerator 112, there are known, for example, means for performing window regeneration according to detection of a correlation value of a guard interval period using the OFDM time domain signal and means for estimating a delay profile of a channel using the delay profile estimator 111 described later and performing window regeneration.

The OFDM frequency domain signal obtained by the FFT arithmetic circuit 106 is supplied to an SP-signal extraction circuit 107a. The SP-signal extraction circuit 107a extracts only inserted SP signals and removes a modulation component of the pilot signals to calculate a channel characteristic in SP positions.

The channel characteristic in the SP positions calculated by the SP-signal extraction circuit 107a is supplied to a time-direction-channel estimator 107b. The time-direction-channel estimator 170b estimates, for each of OFDM symbols, a channel characteristic of a sub-carrier in which the SP signals are arranged. The time-direction-channel estimator 107b can estimate, for all the OFDM symbols, channel characteristics for every three sub-carriers in a frequency direction.

A frequency-direction-channel estimator 108b applies processing in the frequency direction to the channel characteristics calculated for every three sub-carriers by the time-direction-channel estimator 107b and calculates channel characteristics of all sub-carriers in the OFDM symbols.

As a result, it is possible to estimate channel characteristics for all the sub-carriers of the OFDM signal. A compensator 108a removes distortion due to the channel from the OFDM frequency domain signal calculated by the FFT arithmetic circuit 106 using the channel characteristics of all the sub-carriers supplied from the frequency-direction-channel estimator 108b.

The transmission parameter decoder 110 extracts transmission parameter information from the OFDM frequency domain signal by decoding a sub-carrier in which the transmission parameter information is inserted and supplies the transmission parameter information to the error correction circuit 109.

The error correction circuit 109 applies, in accordance with the transmission parameter information supplied from the transmission parameter decoder 110, de-interleave processing to the OFDM frequency domain signal, from which the channel distortion is removed by the channel-distortion compensator 108. The error correction circuit 109 outputs the OFDM frequency domain signal as decoded data through depuncture, Viterbi, diffused signal removal, and RS decoding.

The delay profile estimator 111 calculates an impulse response of the channel and supplies the impulse response to the window regenerator 112. As a method of delay profile estimation, there are known, for example, a method of using a matched filter that sets a guard interval period as a tap coefficient using the OFDM time domain signal and a method of calculating a delay profile by subjecting a channel characteristic supplied from the time-direction-channel estimator 107b to IFFT.

SUMMARY OF THE INVENTION

In the DVB-T standard and the ISDB-T standard, the SP signals are inserted every four symbols in a symbol direction and inserted every twelve carriers in a frequency direction. In a method of performing the estimation of a time direction channel using this arrangement and estimating a channel in the frequency direction using a result of the estimation, it is known that there are restrictions on an estimatable channel characteristic, i.e., a Doppler frequency should be equal to or lower than $1/(Tg+Tu)/8$ [Hz] and a delay should be equal to or smaller than $Tu/3$ [s]. Tg is a guard interval length and Tu is an effective symbol length.

When the OFDM receiver 100 of the past performs channel profile estimation for channel estimation and window regeneration using a result obtained by performing the estimation of a time direction channel, speed of temporal fluctuation in the channel increases and the condition that the Doppler frequency should be equal to or lower than $1/(Tg+Tu)/8$ [Hz] is not satisfied. Then, the OFDM receiver 100 fails in the estimation of a time direction channel. As a result, the OFDM receiver 100 performs wrong channel estimation. This makes it difficult to correctly perform channel distortion compensation and causes significant deterioration.

Concerning the channel distortion compensation, there is also known a method of estimating a channel characteristic in a frequency domain by performing the estimation of a frequency direction channel using SP signals for every twelve carriers without performing the estimation of a time direction channel as in an OFDM receiver 100A shown in FIG. 18. However, with this method, since a maximum delay that can be estimated is $Tu/12$ [s], an estimatable range with respect to delay spread is narrowed.

In the OFDM receiver 100A shown in FIG. 18, the pilot-use channel estimator 107 in the OFDM receiver 100 shown in FIG. 17 includes only the SP-signal extraction circuit 107a. Components same as those in the OFDM receiver 100 are denoted by the same reference numerals and signs in FIG. 18 and explanations of the components are omitted.

A state of sub-carriers estimated by the frequency-direction-channel estimator when the estimation of a time direction channel is not performed is shown in FIG. 19.

In window regeneration, wrong delay profile estimation is performed, inconsistency of a guard adaptive matched filter output and a profile is caused, and an FFT trigger pulse is generated in a wrong position.

Examples of a pilot IFFT output in the case of fast fluctuation in a channel and the failure in the estimation of a time direction channel are shown in FIGS. 20 and 21. In the case of one wave, as shown in FIG. 20, shift and power leakage of a main path occur. In the case of two waves, as shown in FIG. 21, shift and power leakage of any one of a main path and echo or both occurs.

Therefore, there is a need for providing an OFDM receiver and an OFDM signal receiving method for accurately performing both the estimation of a channel in a frequency domain and the estimation of a channel in a time domain without deteriorating multi-path resistance even in a fast movement environment in which the estimation in a time direction channel is difficult, performing appropriate channel distortion correction and window regeneration, and improving reception performance in a movement environment.

Other needs and specific advantages derived therefrom will be made more obvious from the following explanations of embodiments.

As shown in FIGS. 20 and 21, in the case of fast fluctuation in a channel and the failure in the estimation of a time direction channel, a path shifts by integer times of Tu/12 or power leaks in a pilot IFFT output. Thus, according to an embodiment of the present invention, the OFDM receiver may generate a result signal of the estimation of a time direction channel by comparing the pilot IFFT output with an output of a guard-interval-correlation arithmetic circuit and comparing the pilot IFFT output with an output of a guard adaptive matched filter. In accordance with this signal, the OFDM receiver may judge whether the OFDM receiver is in a fast movement environment. In the case of fast movement, the OFDM receiver may perform only the estimation of a frequency direction channel without performing the estimation of a time direction channel. Moreover, OFDM receiver may judge a channel characteristic in a time domain using the result signal.

According to an embodiment of the present invention, there is provided an OFDM receiver which may include OFDM-signal receiving means for receiving an orthogonal frequency division multiplexing (OFDM) signal, channel-characteristic estimating means for estimating a channel characteristic using pilot signals in an OFDM frequency domain signal obtained by subjecting an OFDM time domain signal received by the OFDM-signal receiving means to Fast Fourier Transform (FFT), time-direction-channel estimating means used for the estimation of a channel characteristic in the channel-characteristic estimating means, judging means for judging a result of the estimation of a time direction channel by the time-direction-channel estimating means, switching control means for switching presence or absence of the estimation of a time direction channel by the time-direction-channel estimating means in the channel-characteristic estimating means in accordance with a result of the judgment on the result of the estimation of a time direction channel by the judging means, and transmission-distortion compensating means for applying, on the basis of the channel characteristic estimated by the channel-characteristic estimating means, processing for compensating for transmission distortion to the OFDM frequency domain signal received by the OFDM-signal receiving means and subjected to the Fast Fourier Transform.

According to another embodiment of the present invention, there is provided an OFDM signal receiving method of receiving an orthogonal frequency division multiplexing (OFDM) signal, estimating a channel characteristic using pilot signals in an OFDM frequency domain signal obtained by subjecting a received OFDM time domain signal to Fast Fourier Transform (FFT), and applying, on the basis of the estimated channel characteristic, processing for compensating for transmission distortion to the OFDM frequency domain signal subjected to the Fast Fourier Transform, the OFDM signal receiving method which may include judging a result of the estimation of a time direction channel used for the estimation of a channel characteristic and switching presence or absence of the estimation of a time direction channel in the estimation of a channel characteristic in accordance with a result of the judgment.

According to still another embodiment of the present invention, there is provided an OFDM receiver which may include OFDM-signal receiving means for receiving an orthogonal frequency division multiplexing signal, channel-characteristic estimating means for estimating a channel characteristic using pilot signals in an OFDM frequency domain signal obtained by subjecting an OFDM time domain signal received by the OFDM-signal receiving means to Fast Fourier Transform (FFT), time-direction-channel estimating means used for the estimation of a channel characteristic in the channel-characteristic estimating means, judging means for judging a result of the estimation of a time direction channel by the time-direction-channel estimating means, time-domain-channel-characteristic estimating means for subjecting the result of the estimation of a time direction channel by the time-direction-channel estimating means to Inverse Fast Fourier Transform (IFFT) and estimating a channel characteristic in a time domain, FFT-window regenerating means for performing FFT window regeneration for designating an arithmetic operation range of the Fast Fourier Transform according to the time domain channel characteristic estimated by the time-domain-channel-characteristic estimating means, and transmission-distortion compensating means for applying, on the basis of the channel characteristic estimated by the channel-characteristic estimating means, processing for compensating for transmission distortion to the OFDM frequency domain signal received by the OFDM-signal receiving means and subjected to the Fast Fourier Transform. The FFT-window regenerating means may shift a path presence position for the estimation of a channel characteristic in the time domain by constant times of $\frac{1}{12}$ of an effective symbol length in accordance with a result of the judgment on the result of the estimation of a time direction channel by the judging means.

According to still another embodiment of the present invention, there is provided an OFDM signal receiving method of receiving an orthogonal frequency division multiplexing (OFDM) signal, estimating a channel characteristic using pilot signals in an OFDM frequency domain signal obtained by subjecting a received OFDM time domain signal to Fast Fourier Transform (FFT), and applying, on the basis of the estimated channel characteristic, processing for compensating for transmission distortion to the OFDM frequency domain signal subjected to the Fast Fourier Transform, the OFDM signal receiving method may include estimating a channel in a time direction using pilot signals in the OFDM frequency domain signal, subjecting a result of the estimation of a time direction channel to Inverse Fast Fourier Transform (IFFT) and estimating a channel characteristic in a time domain, judging the result of the estimation of a time direction channel used for the estimation of a channel characteristic, performing FFT window regeneration for designating an arithmetic operation range of the Fast Fourier Transform according to the characteristic of the channel in the time domain, and shifting a path presence position for the estimation of a channel characteristic in the time domain by constant times of $\frac{1}{12}$ of an effective symbol length in accordance with a result of the judgment on the result of the estimation of a time direction channel.

According to still another embodiment of the present invention, there is provided an OFDM receiver which may include OFDM-signal receiving means for receiving an orthogonal frequency division multiplexing signal, channel-characteristic estimating means for estimating a channel characteristic using pilot signals in an OFDM frequency domain signal obtained by subjecting an OFDM time domain signal received by the OFDM-signal receiving means to Fast Fourier Transform (FFT), time-direction-channel estimating means used for the estimation of a channel characteristic in the channel-characteristic estimating means, judging means for judging a result of the estimation of a time direction channel by the time-direction-channel estimating means, switching control means for switching presence or absence of the estimation of a time direction channel by the time-direction-channel estimating means in the channel-characteristic estimating means in accordance with a result of the judgment on the result of the estimation of a time direction channel by the judging means, time-domain-channel-characteristic estimating means for subjecting the result of the estimation of a time direction channel by the time-direction-channel estimating means to Inverse Fast Fourier Transform (IFFT) and estimating a channel characteristic in a time domain, FFT-window regenerating means for performing FFT window regeneration for designating an arithmetic operation range of the Fast Fourier Transform according to the time domain channel characteristic estimated by the time-domain-channel-characteristic estimating means, and transmission-distortion compensating means for applying, on the basis of the channel characteristic estimated by the channel-characteristic estimating means, processing for compensating for transmission distortion to the OFDM frequency domain signal received by the OFDM-signal receiving means and subjected to the Fast Fourier Transform. The switching control means may switch presence or absence of the estimation of a time direction channel by the time-direction-channel estimating means in the channel-characteristic estimating means in accordance with the result of the judgment on the result of the estimation of a time direction channel by the judging means. The FFT-window regenerating means may shift a path presence position for the estimation of a channel characteristic in the time domain by constant times of $1/12$ of an effective symbol length.

According to still another embodiment of the present invention, there is provided an OFDM signal receiving method of receiving an orthogonal frequency division multiplexing (OFDM) signal, estimating a channel characteristic using pilot signals in an OFDM frequency domain signal obtained by subjecting a received OFDM time domain signal to Fast Fourier Transform (FFT), and applying, on the basis of the estimated channel characteristic, processing for compensating for transmission distortion to the OFDM frequency domain signal subjected to the Fast Fourier Transform, the OFDM signal receiving method may include estimating a channel in a time direction using pilot signals in the OFDM frequency domain signal, subjecting a result of the estimation of a time direction channel to Inverse Fast Fourier Transform (IFFT) and estimating a channel characteristic in a time domain, judging the result of the estimation of a time direction channel used for the estimation of a channel characteristic, switching presence or absence of the estimation of a time direction channel in the estimation of a channel characteristic in accordance with a result of the judgment, performing FFT window regeneration for designating an arithmetic operation range of the Fast Fourier Transform according to the characteristic of the channel in the time domain, and shifting a path presence position for the estimation of a channel characteristic in the time domain by constant times of $1/12$ of an effective symbol length in accordance with a result of the judgment on the result of the estimation of a time direction channel.

According to the embodiments of the present invention, it may be possible to accurately perform both the estimation of a channel in a frequency domain and the estimation of a channel in a time domain without deteriorating multi-path resistance even in a fast movement environment in which the estimation in a time direction channel is difficult. This makes it possible to attain appropriate channel distortion correction and window regeneration and improve reception performance in a movement environment.

BRIEF DESCRIPTION OF THE DRAWINGS

FIG. 20 is a diagram showing an example of a pilot IFFT output of one wave in the case of fast fluctuation in a channel and the failure in the estimation of a time direction channel; and FIG. 21 is a diagram showing an example of a pilot IFFT output of two waves in the case of fast fluctuation in a channel and the failure in the estimation of a time direction channel.

DETAILED DESCRIPTION

Embodiments of the present invention will be hereinafter explained in detail with reference to the accompanying drawings. It goes without saying that the present invention is not limited to the embodiments described below and can be modified arbitrarily without departing from the spirit of the present invention.

Figure 1:
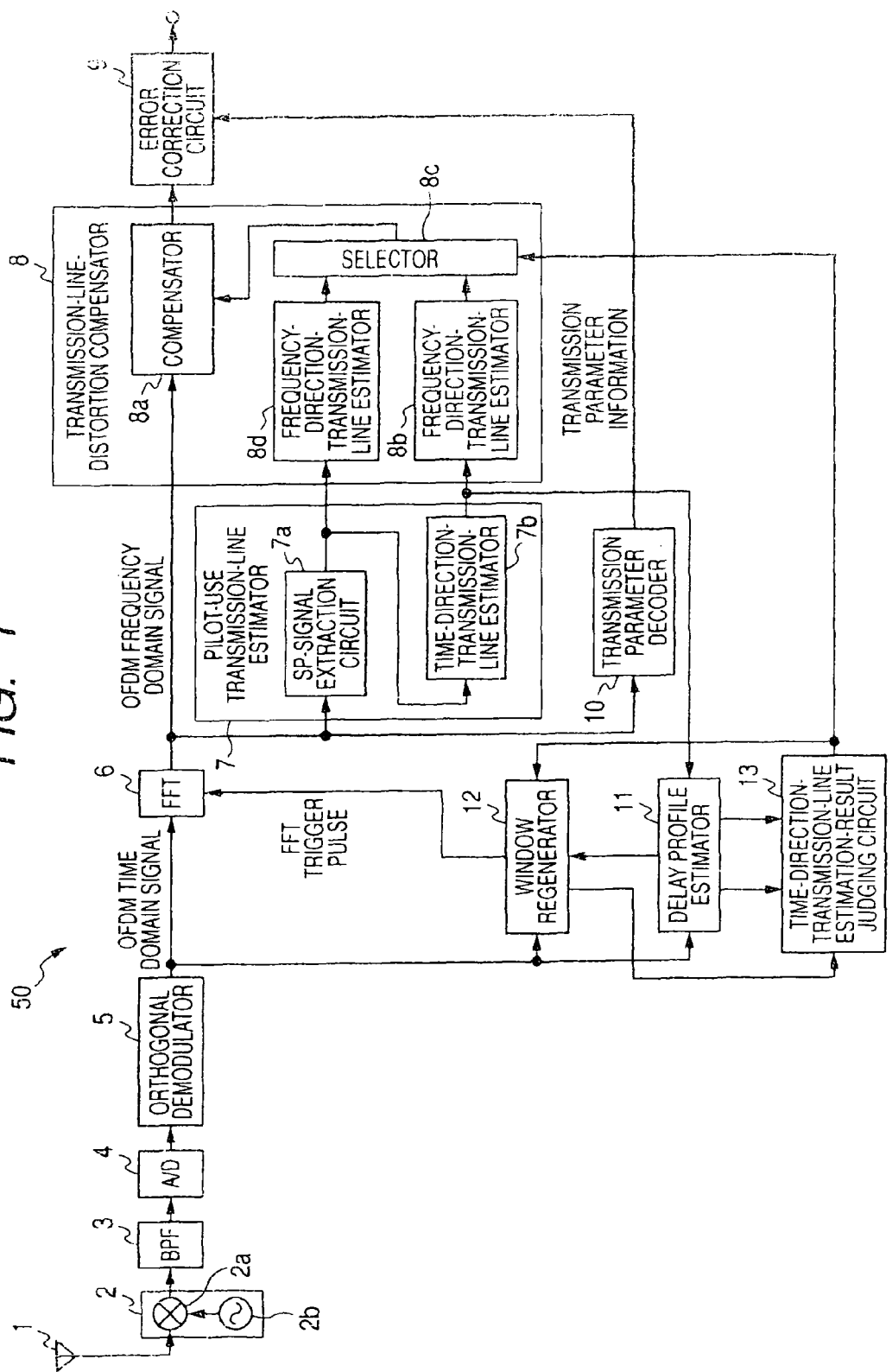
FIG. 1 is a block diagram showing a structure of an OFDM receiver according to an embodiment of the present invention.

The present invention is applied to, for example, an OFDM receiver 50 having a structure shown in FIG. 1.

The OFDM receiver 50 includes an antenna 1, a tuner 2, a band-pass filter (BPF) 3, an A/D converter 4, a digital orthogonal demodulator 5, an FFT arithmetic circuit 6, a pilot-use channel estimator 7, a channel-distortion compensator 8, an error correction circuit 9, a transmission parameter decoder 10, a delay profile estimator 11, a window regenerator 12, and a time-direction-channel estimation-result judging circuit 13.

A broadcast wave of a digital broadcast transmitted from a broadcasting station is received by the antenna 1 of the OFDM receiver 50 and supplied to the tuner 2 as an RF signal.

The tuner 2 includes a local oscillator 2b and a multiplication circuit 2a. The tuner 2 frequency-converts the RF signal received by the antenna 1 into an IF signal. The IF signal obtained by the tuner 2 is filtered by the band-pass filter (BPF) 3 and, then, digitized by the A/D converter 4 and supplied to the digital orthogonal demodulator 5.

The digital orthogonal demodulator 5 orthogonally demodulates the digitized IF signal using a carrier signal of a predetermined frequency (a carrier frequency) and outputs an OFDM signal of a baseband, i.e., an OFDM time domain signal. As a result of orthogonal demodulation, this OFDM time domain signal changes to a complex signal including a real axis component (an I channel signal) and an imaginary axis component (a Q channel signal). The OFDM time domain signal outputted by the digital orthogonal demodulator 5 is supplied to the FFT arithmetic circuit 6, the window regenerator 12, and the delay profile estimator 11.

Figure 2:
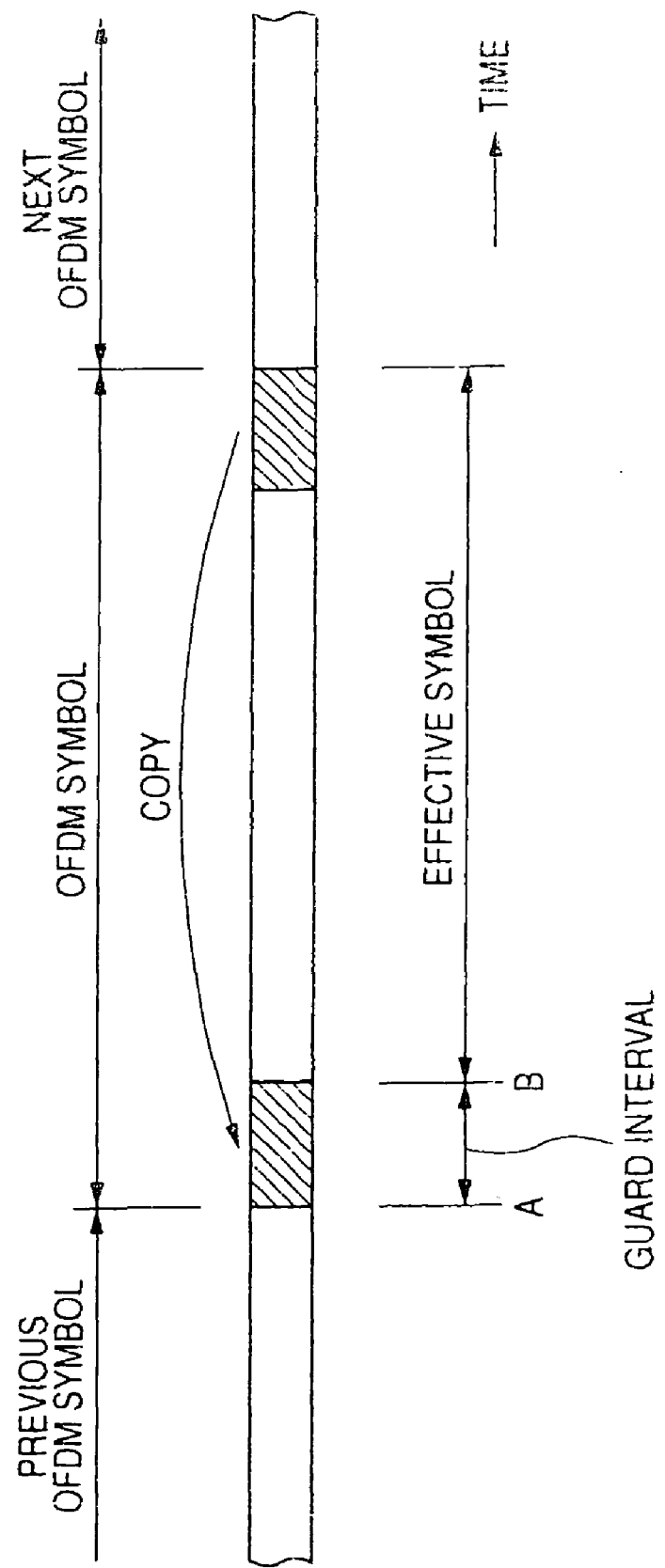
FIG. 2 is a diagram for explaining transmission symbols of an OFDM signal.

The FFT arithmetic circuit 6 applies the FFT operation to the OFDM time domain signal, extracts data orthogonally modulated in each of sub-carriers, and outputs an OFDM frequency domain signal. The FFT arithmetic circuit 6 extracts a signal in a range of an effective symbol length from one OFDM symbol, i.e., excludes a range of a guard interval from one OFDM symbol, and applies the FFT operation to the extracted OFDM time domain signal. Specifically, as shown in FIG. 2 a position where the arithmetic operation is started is any position from a boundary of the OFDM symbol (a position of A in FIG. 2) to an end position of the guard interval (a position of B in FIG. 2). This arithmetic operation range is referred to as an FFT window.

In the OFDM receiver 50, the designation of the FFT window position is performed by the window regenerator 12. As the window regenerator 12, there are known, for example, means for performing window regeneration according to detection of a correlation value of a guard interval period using the OFDM time domain signal and means for estimating a delay profile of a channel using the delay profile estimator 11 described later and performing window regeneration.

The OFDM frequency domain signal obtained by the FFT arithmetic circuit 6 is supplied to an SP-signal extraction circuit 7a of the pilot-use channel estimator 7 and a compensator 8a of the channel-distortion compensator 8.

Figure 3:
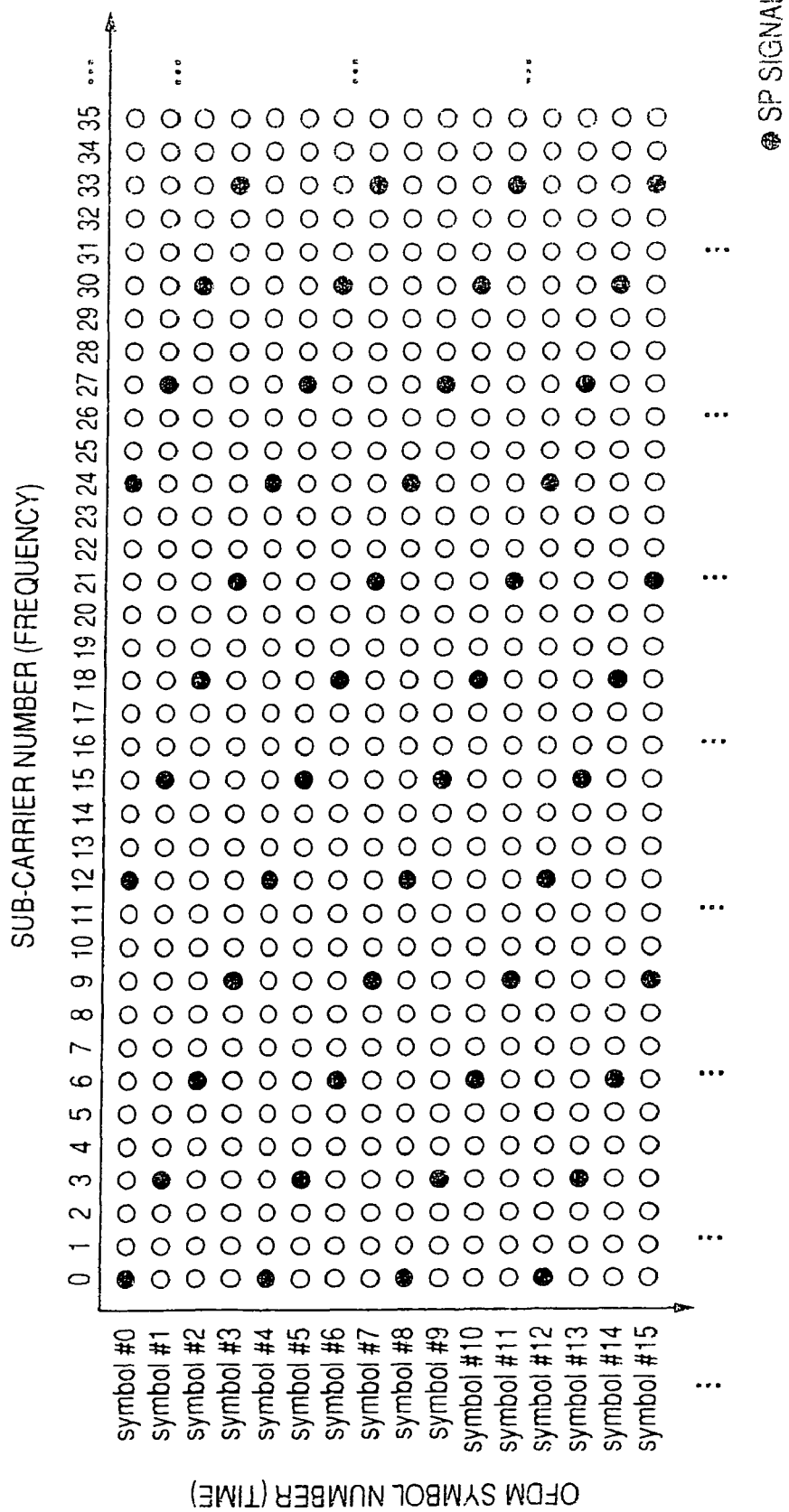
FIG. 3 is a diagram for explaining an arrangement pattern of SP signals in the OFDM signal.

In the pilot-use channel estimator 7, the SP-signal extraction circuit 7a extracts only SP signals inserted in positions shown in FIG. 3 and removes modulation components of the pilot signals to calculate channel characteristics in the SP positions.

Figure 4:
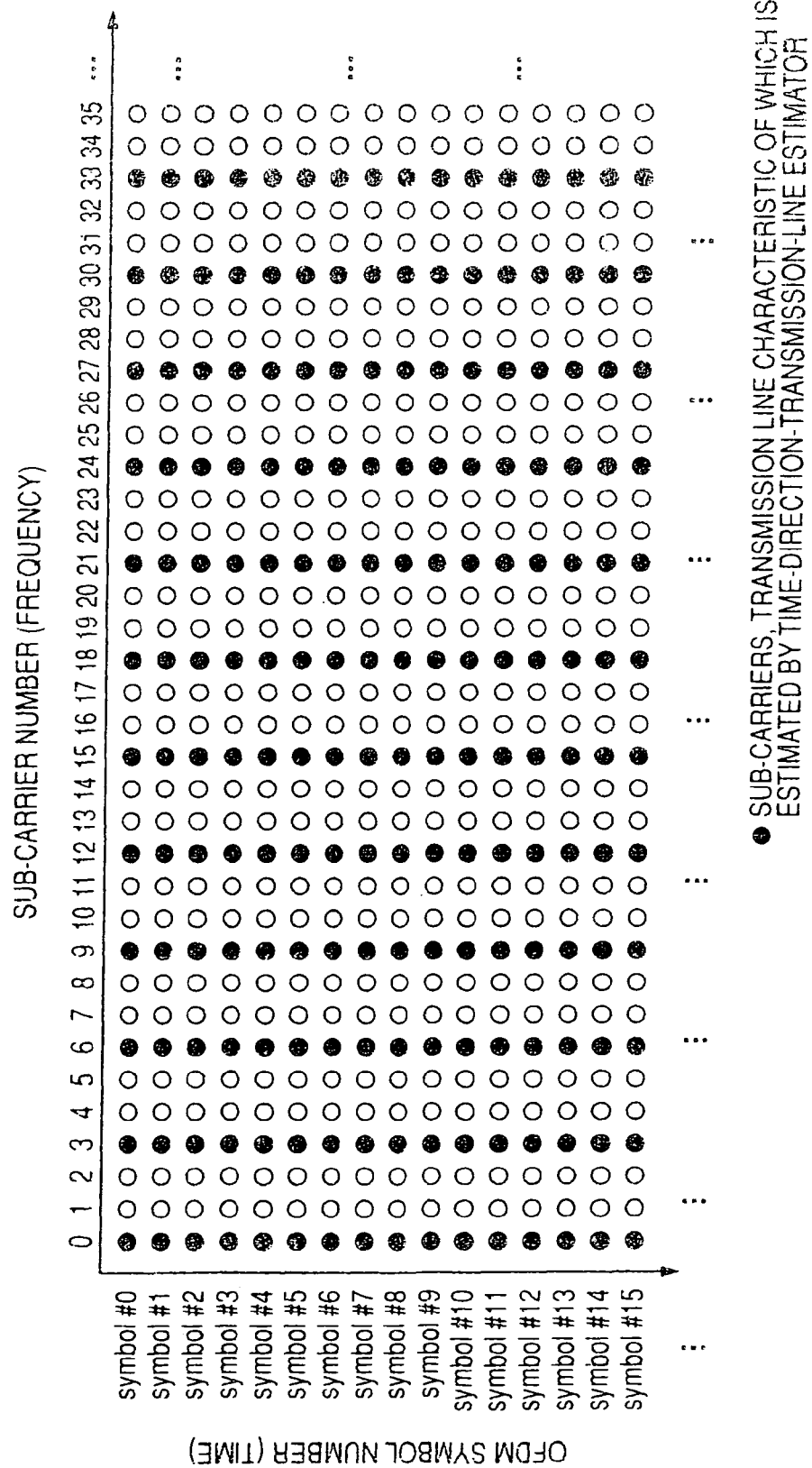
FIG. 4 is a diagram for explaining sub-carriers estimated by a time-direction-channel estimator in the OFDM receiver.

The channel characteristics in the SP positions calculated by the SP-signal extraction circuit 7a are supplied to a time-direction-channel estimator 7b. The time-direction-channel estimator 7b estimates, for each of OFDM symbols, a channel characteristic of a sub-carrier in which the SP signals are arranged. The time-direction-channel estimator 7b can estimate, for all the OFDM symbols, channel characteristics for every three sub-carriers in a frequency direction as shown in FIG. 4.

The pilot-use channel estimator 7 supplies the channel characteristics, which are estimated for every three sub-carries in the frequency direction for all the OFDM symbols by the time-direction-channel estimator 7b, to the frequency-direction-channel estimator 8b of the channel-distortion compensator 8. The pilot-use channel estimator 7 supplies the channel characteristics in the SP positions calculated by the SP-signal extraction circuit 7a to a frequency-direction-channel estimator 8d of the channel-distortion compensator 8.

The channel-distortion compensator 8 includes the compensator 8a, the frequency-direction-channel estimator 8b, the frequency-direction-channel estimator 8d, and a selector 8c.

Figure 5:
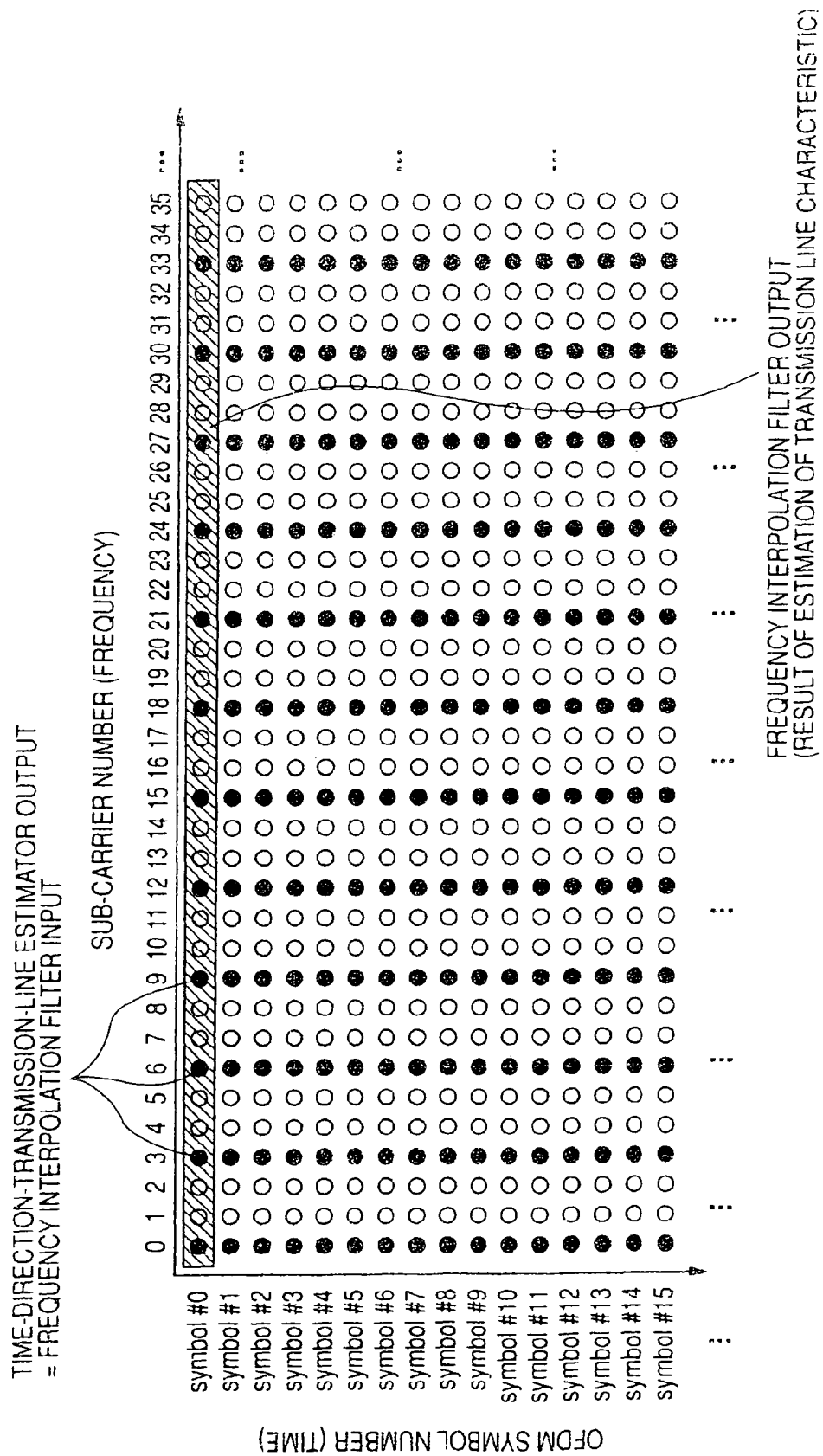
FIG. 5 is a diagram for explaining sub-carriers estimated by a frequency-direction-channel estimator in the OFDM receiver.

In the channel-distortion compensator 8c, the frequency-direction-channel estimator 8b applies processing in the frequency direction to the channel characteristics calculated for every three sub-carriers by the time-direction-channel estimator 7b. As shown in FIG. 5, the frequency-direction-channel estimator 8b calculates transmission characteristics of all the sub-carriers in the OFDM symbol. As a result, it is possible to estimates a channel characteristic for all the sub-carriers of the OFDM signal.

The frequency-direction-channel estimator 8d applies processing in the frequency direction to the channel characteristics in the SP positions calculated by the SP-signal extraction circuit 7a and estimates a channel characteristic in the frequency direction.

The selector 8c selectively supplies, according to a judgment output by the time-direction-channel estimation-result judging circuit 13, an output of the frequency-direction-channel estimator 8b or the frequency-direction-channel estimator 8d to the compensator 8a.

The compensator 8a removes distortion due to the channel from the OFDM frequency domain signal calculated by the FFT arithmetic circuit 6 using the output of the frequency-direction-channel estimator 8b or the frequency-direction-channel estimator 8d, i.e., the estimated channel characteristic in the frequency direction.

The time-direction-channel estimation-result judging circuit 13 judges a result of the estimation of a time direction channel by the time-direction-channel estimator 7b provided in the pilot-use channel estimator 7. The time-direction-channel estimation-result judging circuit 13 controls the selector 8c in accordance with a result of the judgment to thereby switch presence or absence of the estimation of a time direction channel in the pilot-use channel estimator 7.

The transmission-parameter decoder 10 extracts transmission parameter information from the OFDM frequency domain signal by decoding sub-carriers in which transmission parameter information is inserted and supplies the transmission parameter information to the error correction circuit 9.

The error correction circuit 9 applies, in accordance with the transmission parameter information supplied from the transmission parameter decoder 10, de-interleave processing to the OFDM frequency domain signal, from which the channel distortion is removed by the channel-distortion compensator 8. The error correction circuit 9 outputs the OFDM frequency domain signal as decoded data through depuncture, Viterbi, diffused signal removal, and RS decoding.

The delay profile estimator 11 calculates an impulse response of the channel and supplies the impulse response to the window regenerator 12. As a method of delay profile estimation, for example, a method of using a matched filter that sets a guard interval period as a tap coefficient using the OFDM time domain signal and a method of calculating a delay profile by subjecting a channel characteristic supplied from the time-direction-channel estimator 7b to IFFT are adopted.

As in the OFDM receiver 50, an orthogonal frequency division multiplexing signal is received and a channel characteristic is estimated using pilot signals in an OFDM frequency domain signal obtained by subjecting a received OFDM time domain signal to Fast Fourier Transform (FFT). When processing for compensating for transmission distortion is applied to the OFDM frequency domain signal subjected to the Fast Fourier Transform on the basis of the estimated channel characteristic, a result of the estimation of a channel in a time direction used for the estimation of a channel characteristic is judged. Presence or absence of the estimation of a time direction channel in the estimation of a channel characteristic is switched. This makes it possible to perform highly accurate channel distortion compensation.

The window regenerator 12 and the delay profile estimator 11 will be explained more in detail.

Figure 6:
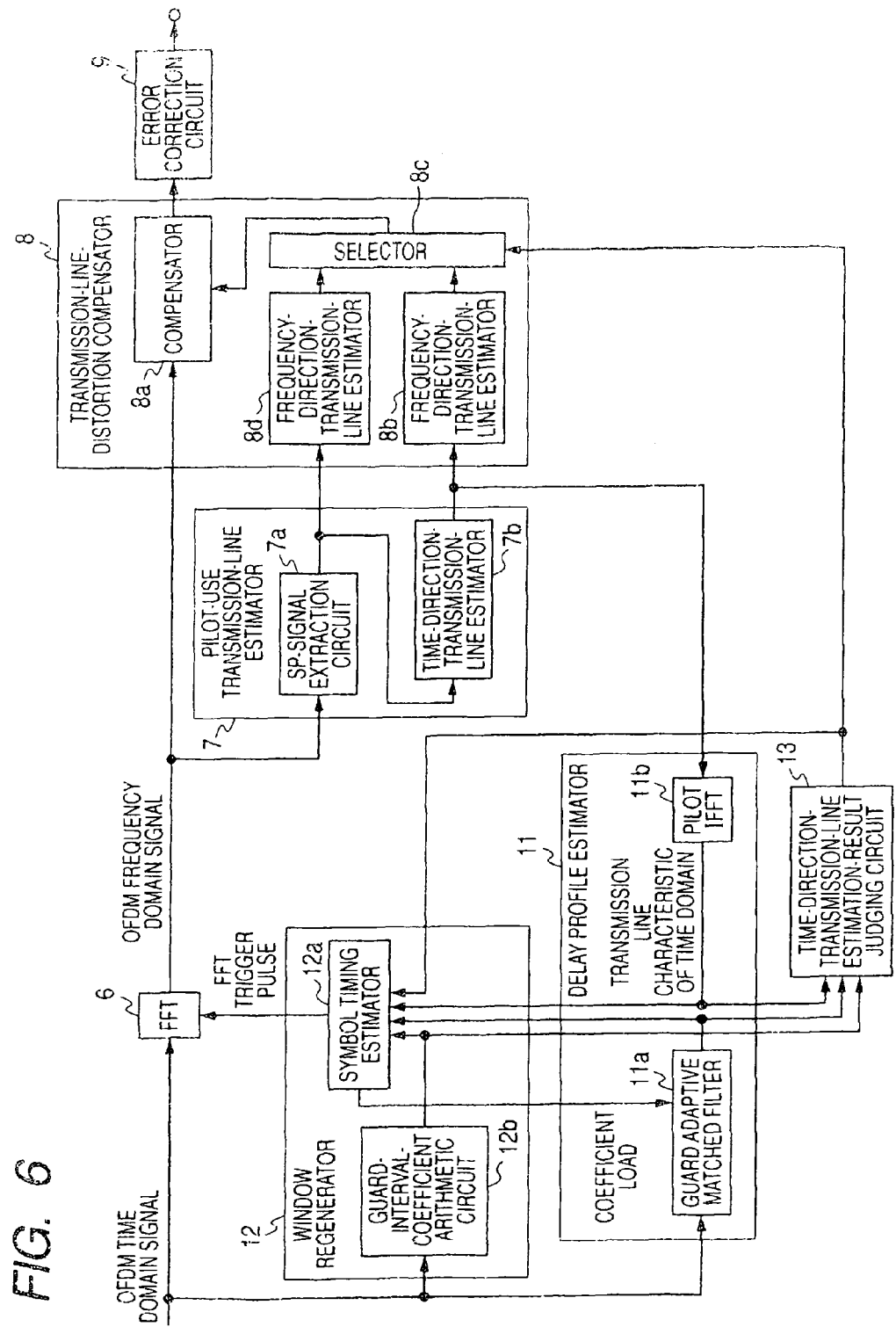
FIG. 6 is a block diagram showing details of a window regenerator and a delay profile estimator in the OFDM receiver and peripheral circuits related thereto.

A detailed block diagram of the window regenerator 12 and the delay profile estimator 11 and peripheral circuits related thereto are shown in FIG. 6.

In FIG. 6, components same as those in FIG. 1 are denoted by the same reference numerals and signs and the components in FIG. 1 unrelated to the window regenerator 12 and the delay profile estimator 11 are omitted.

In the window regenerator 12 and the delay profile estimator 11 shown in FIG. 6, when an OFDM time domain signal is inputted, first, a guard-interval-correlation arithmetic circuit 12b of the window regenerator 12 performs approximate path estimation. A symbol timing estimator 12a performs rough window regeneration from an output of the guard-interval-correlation arithmetic circuit 12b and determines an FFT operation position. The FFT arithmetic circuit 6 starts an FFT operation.

The pilot-use channel estimator 7 performs channel estimation in a frequency domain using an OFDM frequency domain signal, which is an FFT output of the FFT arithmetic circuit 6. A pilot IFFT 11b of the delay profile estimator 11 subjects a result of the estimation of a time direction channel by the time-direction-channel estimator 7b to an IFFT operation to obtain a channel characteristic in a time domain. The symbol timing estimator 12a of the window regenerator 12 accurately adjusts an FFT trigger pulse on the basis of this IFFT output. Finally, the symbol timing estimator 12a extracts positional information of a strongest path from the IFFT output of the pilot IFFT 11b and actuates a guard adoptive matched filter 11a using the positional information. Thereafter, the symbol timing estimator 12a monitors a path presence position of a channel profile and appropriately adjusts the FFT trigger pulse using respective outputs of the guard-interval-correlation arithmetic circuit 12b, the pilot IFFT 11b, and the guard adaptive matched filter 11a.

In the OFDM receiver 50, a result of the judgment by the time-direction-channel estimation-result judging circuit 13 is supplied to the symbol timing estimator 12a. Then, the window regenerator 12 shifts a path presence position for the estimation of a channel characteristic in the time domain by constant times of $\frac{1}{12}$ of an effective symbol length in accordance with a result of the judgment on the result of the estimation of a time direction channel to accurately perform window regeneration.

The guard-interval-correlation arithmetic circuit 12b, the guard adaptive matched filter 11a, and the pilot IFFT 11b will be explained in detail.

Figure 7:
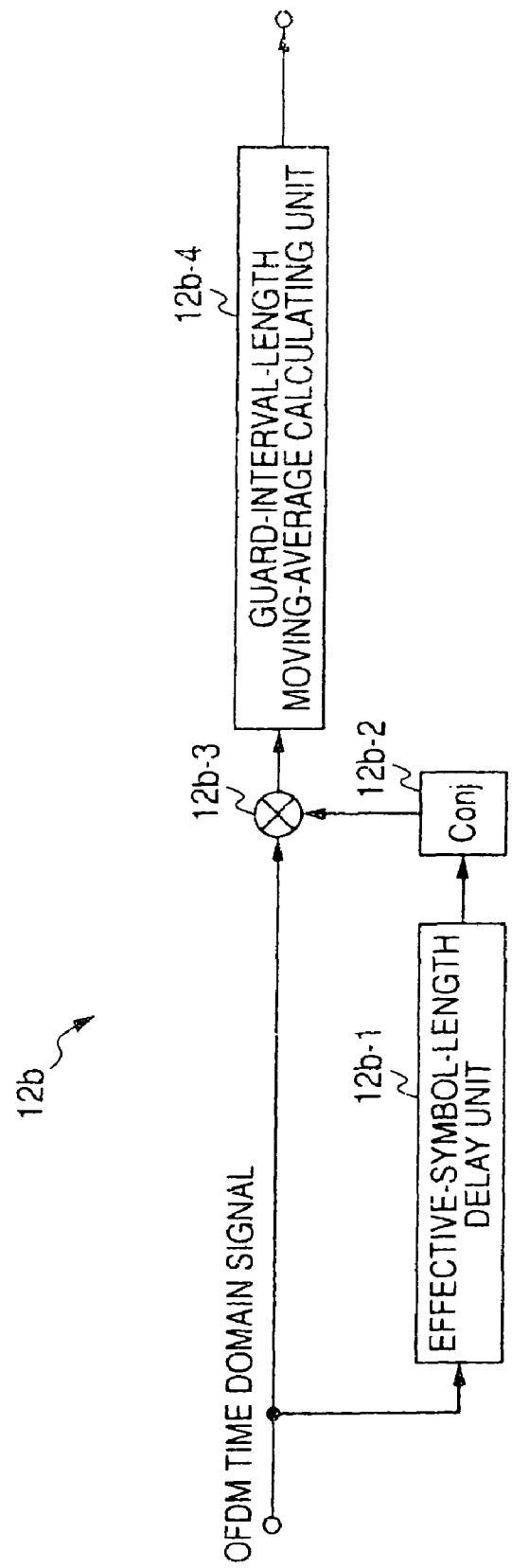
FIG. 7 is a block diagram showing a structure of a guard-interval-correlation arithmetic circuit in the OFDM receiver.
Figure 8:
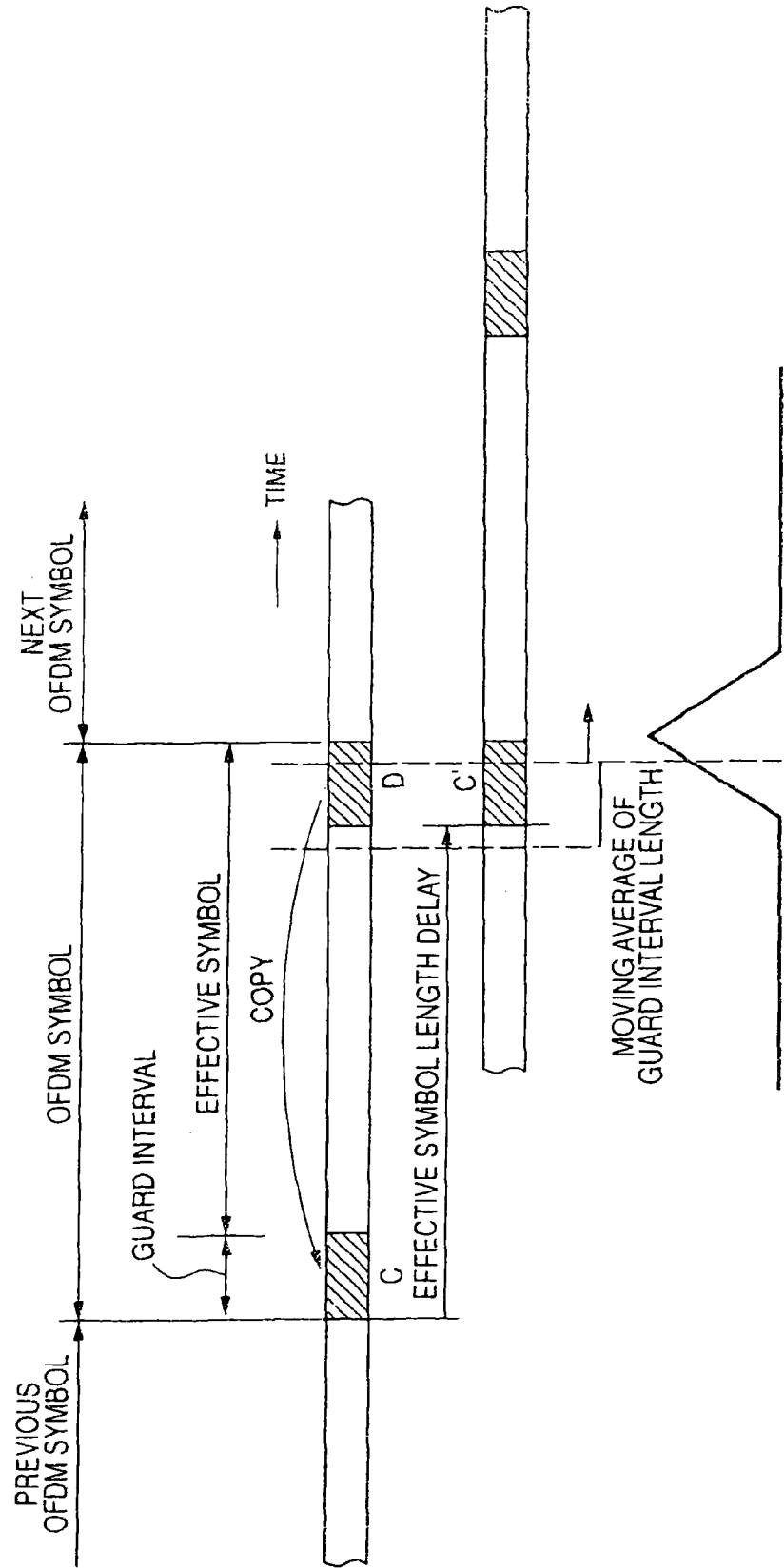
FIG. 8 is a diagram for explaining a guard interval correlation.

The guard-interval-correlation arithmetic circuit 12b includes, for example, as shown in FIG. 7, an effective-symbol-length delay unit 12b-1, a complex conjugate unit 12b-2, a complex multiplier 12b-3, and a guard-interval-length moving-average calculating unit 12b-4. FIG. 8 is a diagram showing a state of calculation of a guard interval correlation.

As explained with reference to FIG. 2, a guard interval is a copy of a part of the latter half of an effective symbol. Thus, a signal C and a signal D in shaded portions shown in FIG. 8 are completely the same signals.

An OFDM signal has a characteristic that, since a guard interval portion and the latter half of an effective symbol are the same signal, the guard interval portion and the latter half of the effective symbol have a strong correlation and a correlation in the other portions is extremely small. It is possible to detect boundaries of symbols by calculating a correlation value in the guard-interval-correlation arithmetic circuit 12b having the structure shown in FIG. 7 using this characteristic. In FIG. 8, a state for explanation of operations of the guard-interval-correlation arithmetic circuit 12b having the structure in FIG. 7 is shown. In the state, an OFDM time domain signal and a signal extracted by the complex conjugate unit 12b-2 from a signal obtained by delaying the OFDM time domain signal by an effective symbol length with the effective-symbol-length delay unit 12b-1 are multiplied by the complex conjugate unit 12b-2 and a moving average of a guard interval length is calculated by the guard-interval-length moving-average calculating unit 12b-4. Since the OFDM time domain signal is simply delayed by the effective symbol length, a signal C' and the signal C in shaded portions shown in FIG. 8 are completely the same signals. Since the signal C is a copy of the signal D, the signal C' and the signal D output a strong correlation.

Figure 9:
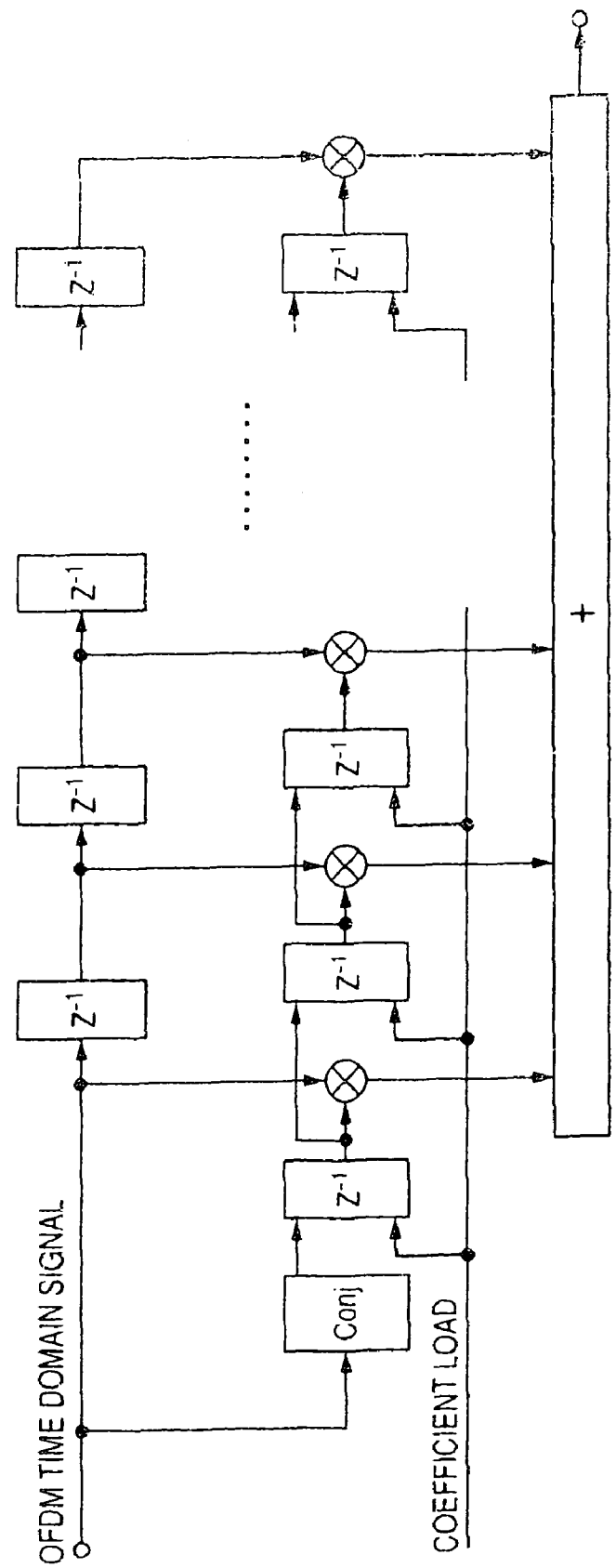
FIG. 9 is a block diagram for explaining a structure of a guard adaptive matched filter in the OFDM receiver.
Figure 10:
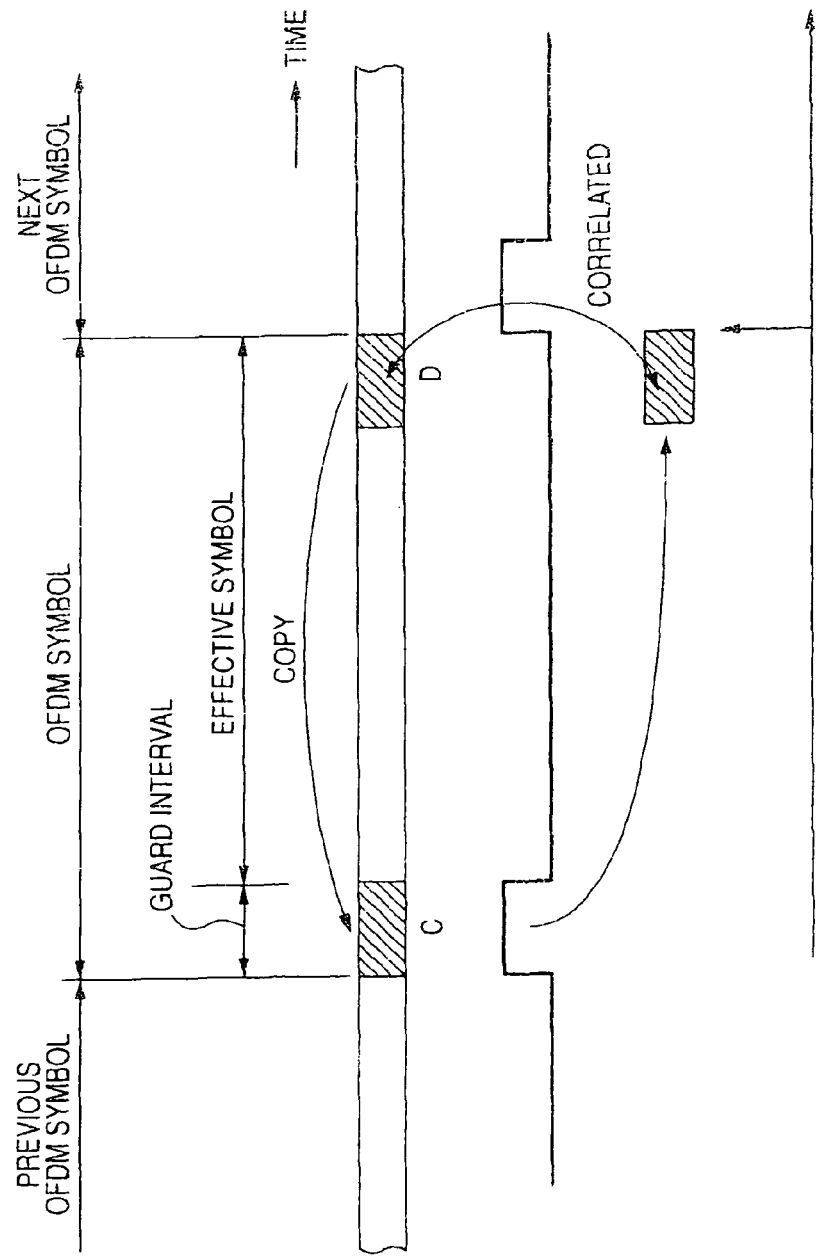
FIG. 10 is a diagram for explaining timing of the guard adaptive matched filter.

The guard adaptive matched filter 11a basically includes, for example, as shown in FIG. 9, an FIR filter. A filter coefficient of the guard adaptive matched filter 11a is adapted to load complex conjugate of data at specific timing. This load timing is exactly timing when the filter coefficient becomes complex conjugate of a guard interval of a main path. In other words, this filter is a circuit that calculates a correlation with data in the guard interval portion. Since the guard interval is the same signal as the latter half of the effective symbol, a strong correlation is shown at the end of the symbol. In the case of a multi-path, as shown in FIG. 10, a strong correlation is shown at the ends of symbols of respective delay waves. It is seen in what kind of profile the multi-path is present by monitoring correlation outputs of the delay waves.

Figure 11:
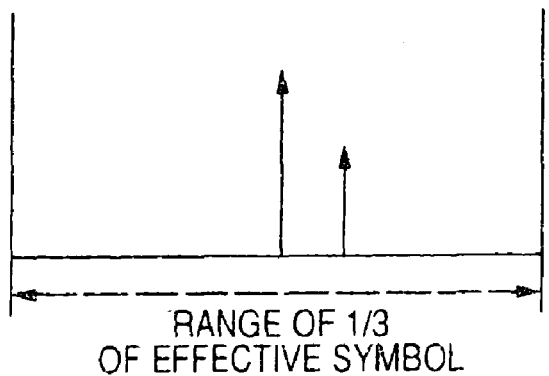
FIG. 11 is an output waveform chart in the case of a two-wave multi-path showing an impulse response of a channel calculated by pilot IFFT in the OFDM receiver.

The pilot IFFT 11b calculates an impulse response of the channel in the time domain by subjecting the channel characteristic in the time direction in the frequency domain calculated by the time-direction-channel estimator 7b to the IFFT. The pilot IFFT 11b can calculate an impulse response of the channel as shown in FIG. 11. However, since the data for every three sub-carriers is used, the impulse response can be estimated only in a range of $\frac{1}{3}$ of the effective symbol. When there is a delay wave exceeding this range, aliasing occurs.

Figure 12:
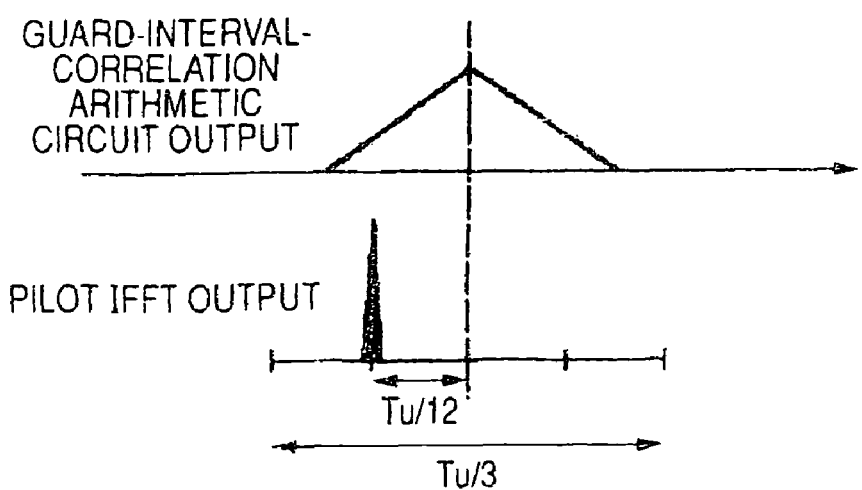
FIG. 12 is a diagram schematically showing a method of judging presence or absence of shift of a main path by a time-direction-channel estimation-result judging circuit in the OFDM receiver.

As described above, the time-direction-channel estimator 7b of the pilot-use channel estimator 7 performs channel estimation in the frequency domain and the pilot IFFT 11b of the delay profile estimator 11 subjects a result of the channel estimation to the IFFT operation to calculate the channel characteristic in the time domain. The guard-interval-correlation arithmetic circuit 12b that performs the detection of a correlation in the guard interval period obtains an operation result for the OFDM time domain signal. The time-direction-channel estimation-result judging circuit 13 can, for example, judge presence or absence of shift of the main path as shown in FIG. 12 and judge a result of the estimation of a time direction channel by comparing the channel characteristic with the operation result.

Figure 13:
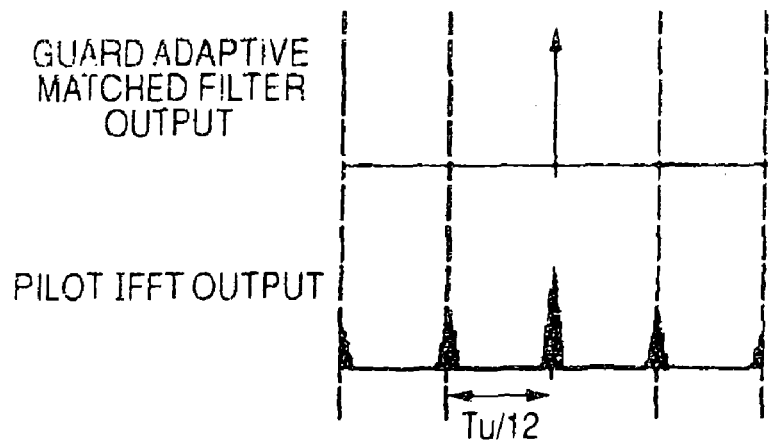
FIG. 13 is a diagram schematically showing a method of judging presence or absence of power leakage of the main path by the time-direction-channel estimation-result judging circuit.
Figure 14:
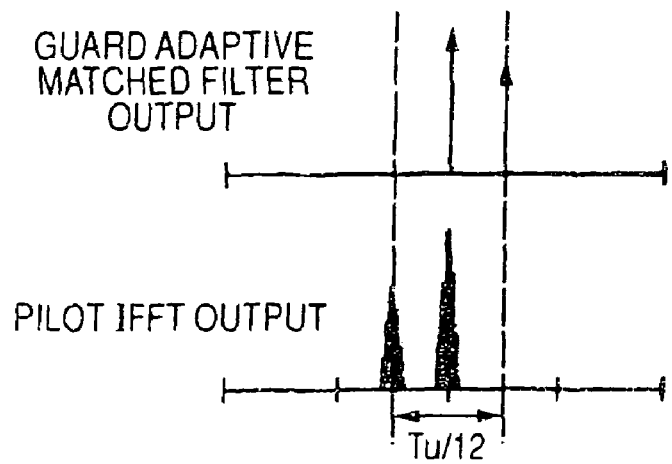
FIG. 14 is a diagram schematically showing a method of judging presence or absence of shift of echo by the time-direction-channel estimation-result judging circuit.
Figure 15:
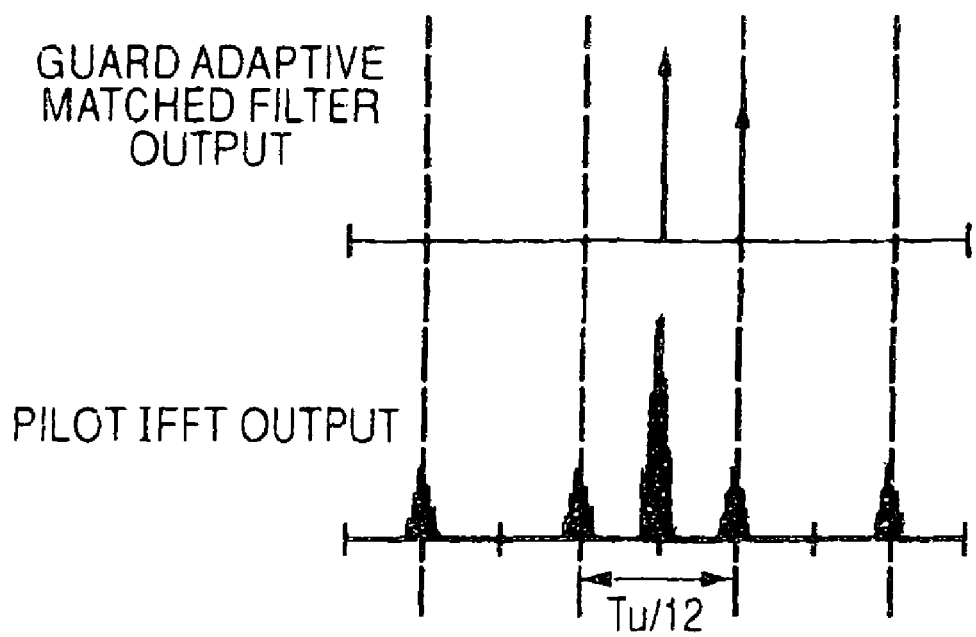
FIG. 15 is a diagram schematically showing a method of judging presence or absence of power leakage of the echo by the time-direction-channel estimation-result judging circuit.

The guard adaptive matched filter 11a that performs the detection of a correlation of data in the guard interval period obtains a detection result for the OFDM time domain signal. The time-direction-channel estimation-result judging circuit 13 can, for example, check power leakage of the main path as shown in FIG. 13, judge shift of echo as shown in FIG. 14, or check power leakage of echo as shown in FIG. 15, and judge a result of the estimation of a time direction channel by comparing the channel characteristic in the time domain with the operation result.

Figure 16:
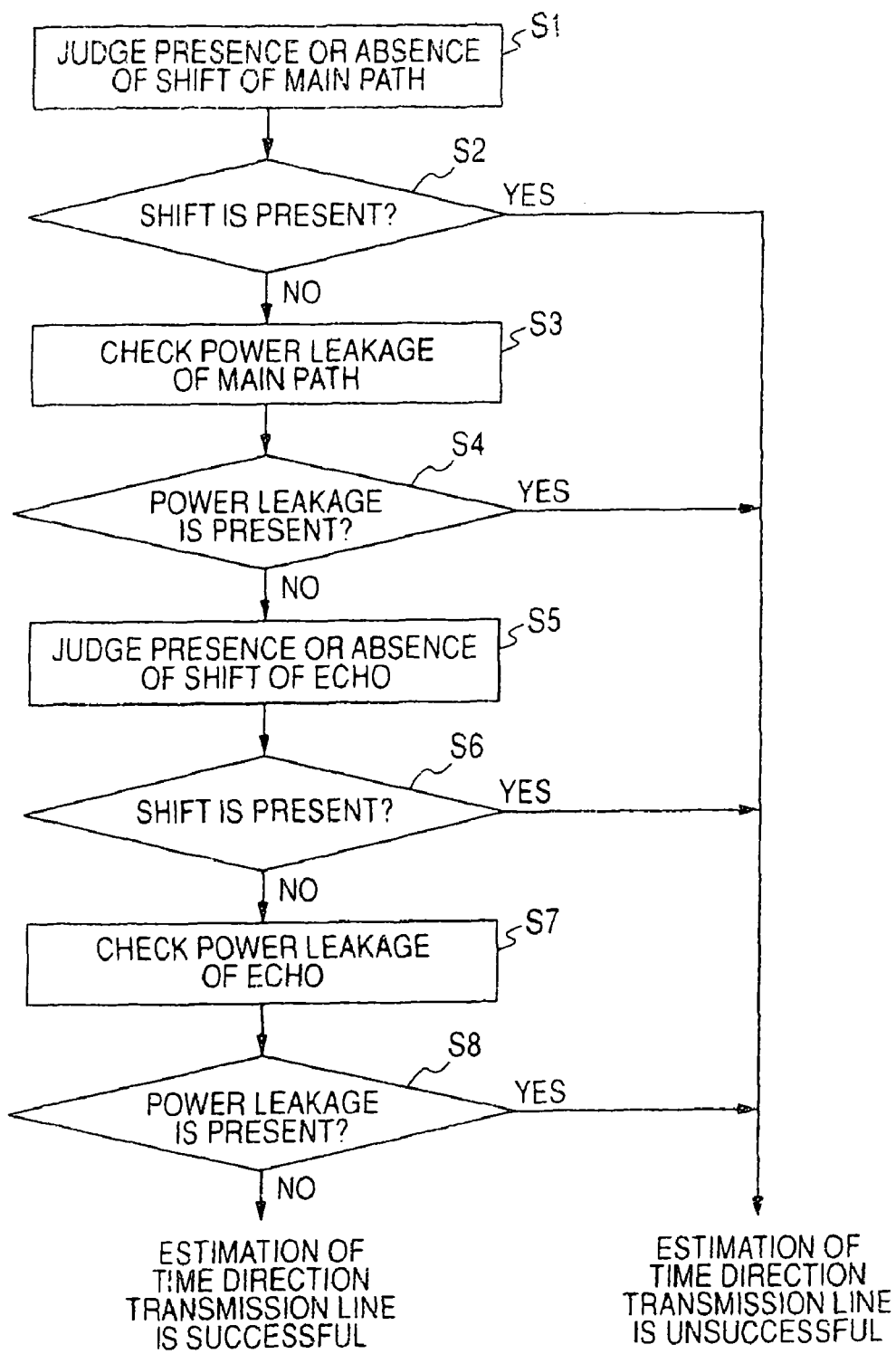
FIG. 16 is a flowchart showing operations of the time-direction-channel estimation-result judging circuit.
Figure 17:
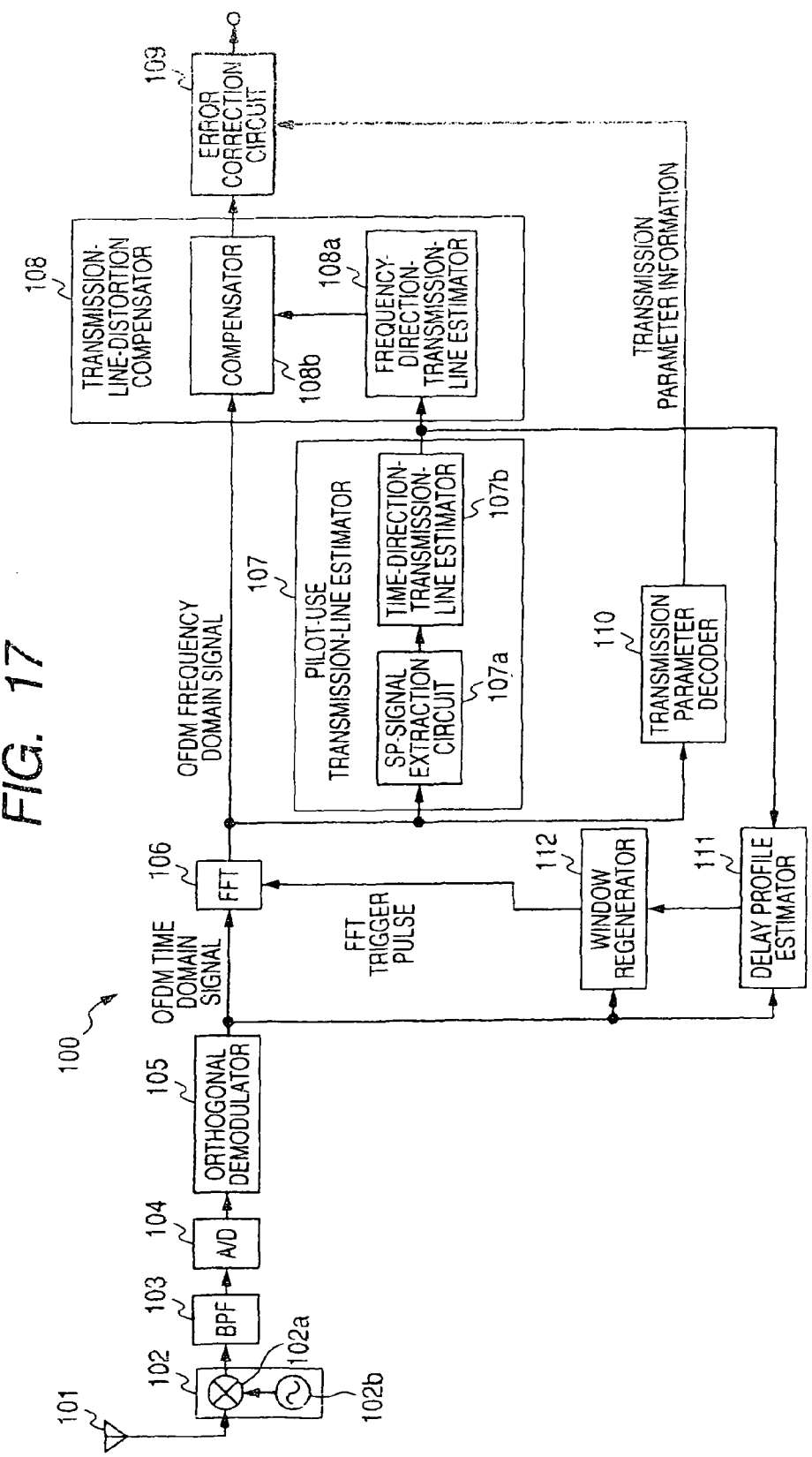
FIG. 17 is a block diagram showing a structure of a basic OFDM receiver of ISDB-T of the past.
Figure 18:
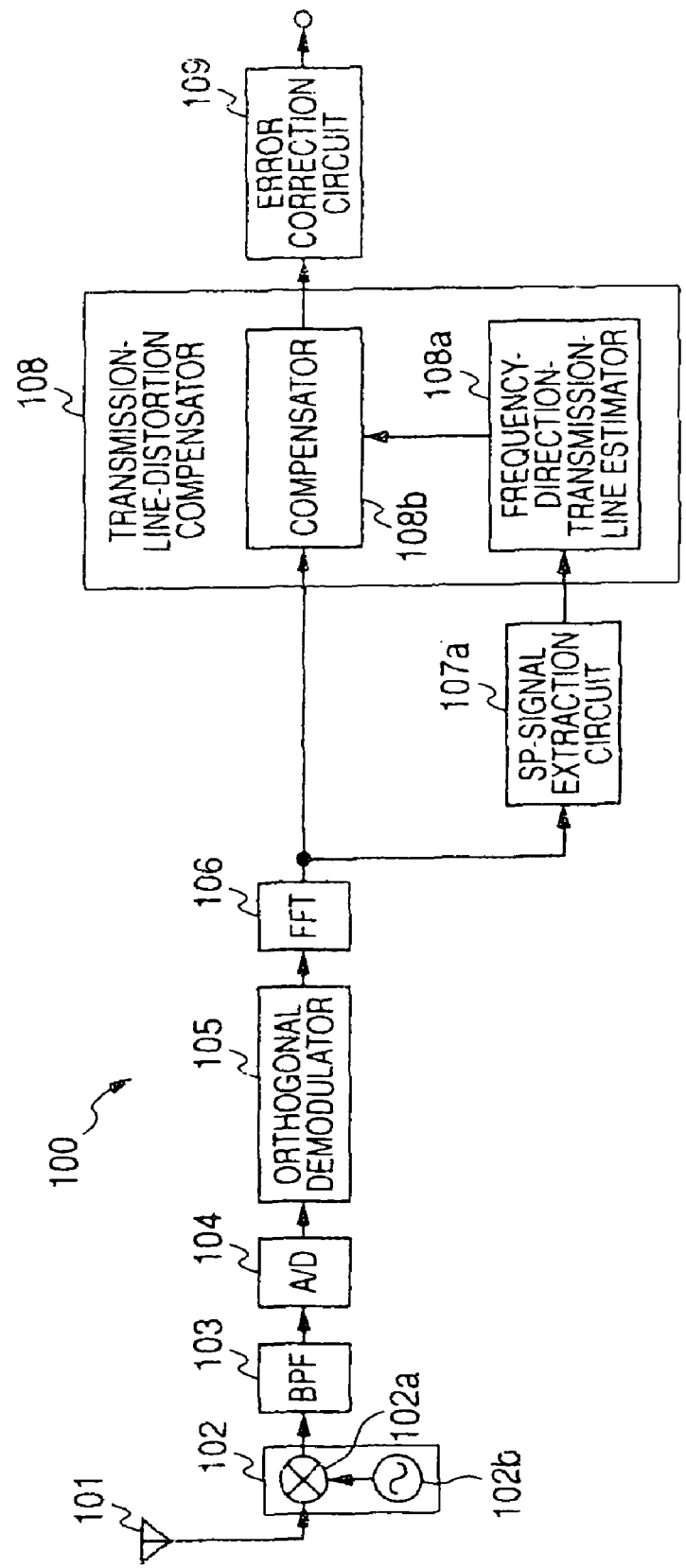
FIG. 18 is a block diagram showing a structure of an OFDM receiver that estimates a channel characteristic in a frequency domain by performing the estimation of a frequency direction channel using SP signals for every twelve carriers without performing the estimation of a time direction channel.
Figure 19:
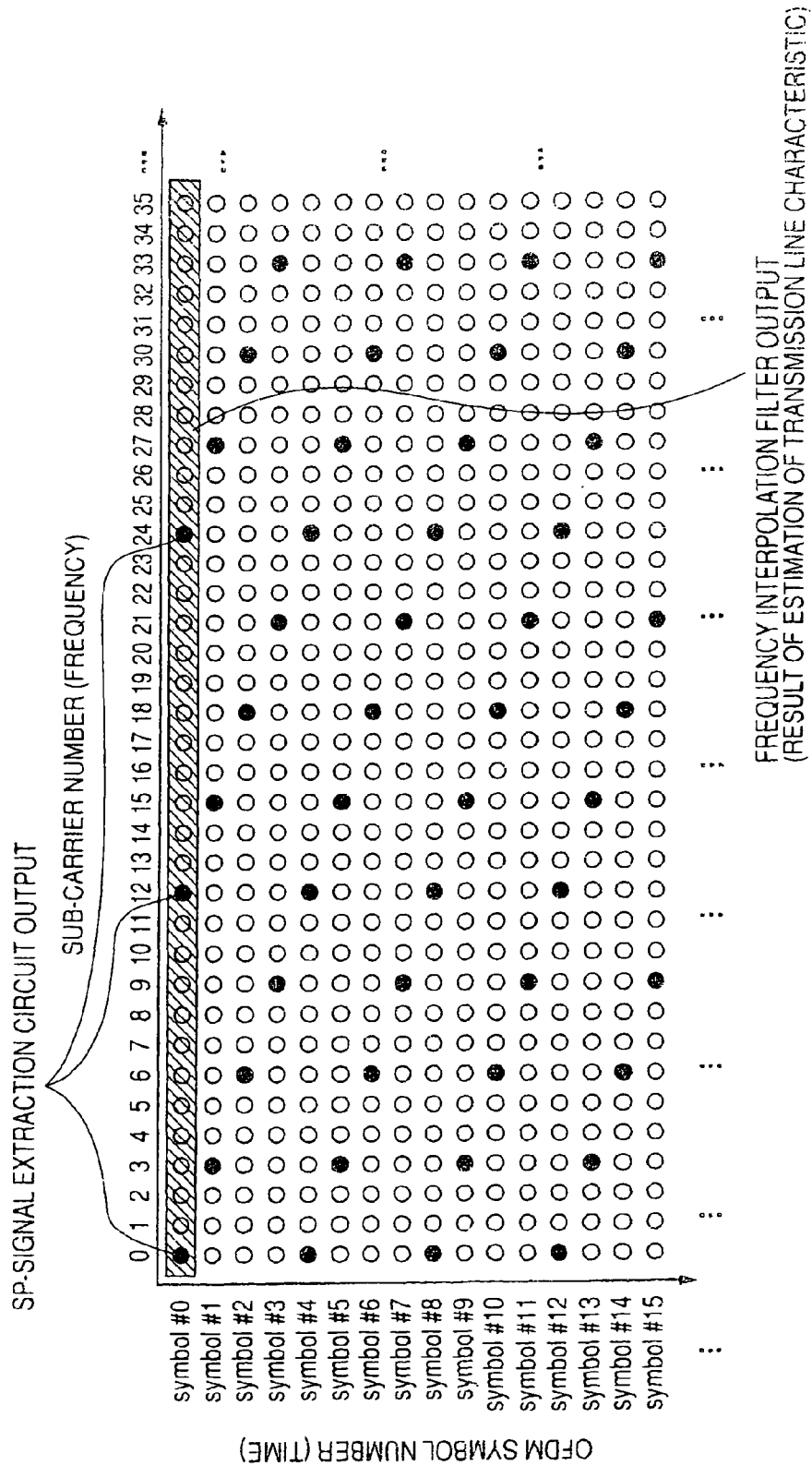
FIG. 19 is a diagram showing a state of sub-carriers estimated by the frequency-direction-channel estimator when the estimation of a time direction channel is not performed.

The time-direction-channel estimation-result judging circuit 13 in the OFDM receiver 50 judges a result of the estimation of a time direction channel by, as shown in a flowchart in FIG. 16, comparing the result of the detection by the guard adaptive matched filter 11a and the operation result by the guard-interval-correlation arithmetic circuit 12b with the channel characteristic in the time domain calculated by the pilot IFFT 11b of the delay profile estimator 11 while switching the detection result and the operation result.

In other words, in the OFDM receiver 50, the time-direction-channel estimation-result judging circuit 13 compares the operation result obtained by the guard-interval-correlation arithmetic circuit 12b with the result of the IFFT operation by the pilot IFFT 11b (step S1) and judges presence or absence of shift of the main path (step S2). When a result of the judgment is "YES", i.e., there is the shift of the main path, for example, as shown in FIG. 12, the time-direction-channel estimation-result judging circuit 13 judges that the estimation of a time direction channel is unsuccessful.

When the result of the judgment in step S2 is "NO", i.e., there is no shift of the main path, the time-direction-channel estimation-result judging circuit 13 compares the result of the detection by the guard adaptive matched filter 11a with the result of the IFFT operation by the pilot IFFT 11b (step S3) and judges presence or absence of power leakage of the main path (step S4). When a result of the judgment is "YES", i.e., there is power leakage of the main path, for example, as shown in FIG. 13, the time-direction-channel estimation-result judging circuit 13 judges that the estimation of a time direction channel is unsuccessful.

When the result of the judgment in step S4 is "NO", i.e., there is no power leakage of the main path, the time-direction-channel estimation-result judging circuit 13 compares the result of the detection by the guard adaptive matched filter 11a with the result of the IFFT operation by the pilot IFFT 11b (step S5) and judges presence or absence of shift of echo (step S6). When a result of the judgment is "YES", i.e., when there is shift of echo, for example, as shown in FIG. 14, the time-direction-channel estimation-result judging circuit 13 judges that the estimation of a time direction channel is unsuccessful.

When the result of the judgment in step S6 is "NO", i.e., there is no shift of echo, the time-direction-channel estimation-result judging circuit 13 compares the result of the detection by the guard adaptive matched filter 11a with the result of the IFFT operation by the pilot IFFT 11b (step S7) and judges presence or absence of power leakage of echo (step S8).

When a result of the judgment is "YES", i.e., there is power leakage of echo, for example, as shown in FIG. 15, the time-direction-channel estimation-result judging circuit 13 judges that the estimation of a time direction channel is unsuccessful.

When the result of the judgment in step S8 is "NO", i.e., there is no power leakage of echo, the time-direction-channel estimation-result judging circuit 13 judges that the estimation of a time direction channel is successful.

In the OFDM receiver 50 having the structure described above, a channel characteristic in a time direction is estimated using pilot signals in the OFDM frequency domain signal, a result of the estimation of a time direction channel is subjected to Inverse Fast Fourier Transform (IFFT) to estimate a channel characteristic in a time domain, a result of the estimation of a time direction channel used for the estimation of a channel characteristic is judged, presence or absence of the estimation of a time direction channel in the estimation of a channel characteristic is switched in accordance with a result of the judgment, FFT window regeneration for designating an arithmetic operation range of Fast Fourier Transform is performed according to the channel characteristic in the time domain, and a path presence position for the estimation of a channel characteristic in the time domain is shifted by constant times of $\frac{1}{12}$ of an effective symbol length in accordance with a result of the judgment on the result of the estimation of a time direction channel. This makes it possible to perform accurate channel distortion compensation and window regeneration, accurately perform both the estimation of a channel in a frequency domain and the estimation of a channel in a time domain without deteriorating multi-path resistance even in a fast movement environment in which the estimation of a time direction channel is difficult, perform appropriate channel distortion correction and window regeneration, and improve reception performance in a movement environment.

It should be understood by those skilled in the art that various modifications, combinations, sub-combinations, and alterations may occur depending on design requirements and other factors insofar as they are within the scope of the appended claims or the equivalents thereof.

The invention claimed is:

1. An OFDM receiver comprising:
OFDM-signal receiving means for receiving an orthogonal frequency division multiplexing signal;
channel-characteristic estimating means for estimating a channel characteristic using pilot signals in an OFDM frequency domain signal obtained by subjecting an OFDM time domain signal received by the OFDM-signal receiving means to Fast Fourier Transform (FFT);
time-direction-channel estimating means used for the estimation of a channel characteristic in the channel-characteristic estimating means;
judging means for judging a result of the estimation of a time direction channel by the time-direction-channel estimating means;
switching control means for switching presence or absence of the estimation of a time direction channel by the time-direction-channel estimating means in the channel-characteristic estimating means in accordance with a result of the judgment on the result of the estimation of a time direction channel by the judging means; and
transmission-distortion compensating means for applying, on the basis of the channel characteristic estimated by the channel-characteristic estimating means, processing for compensating for transmission distortion to the OFDM frequency domain signal received by the OFDM-signal receiving means and subjected to the Fast Fourier Transform.

2. An OFDM receiver according to claim 1, further comprising:
time-domain-channel-characteristic estimating means for subjecting the result of the estimation of a time direction channel by the time-direction-channel estimating means to Inverse Fast Fourier Transform (IFFT) and estimating a channel characteristic in a time domain; and
guard-interval-correlation arithmetic means for applying detection of a correlation in a guard interval period to an OFDM time domain signal received by the OFDM-signal receiving means, wherein
the judging means judges a result of the estimation of a time direction channel by comparing a result of the estimation by the time-domain-channel-characteristic estimating means with a result of an arithmetic operation by the guard-interval-correlation arithmetic means.

3. An OFDM receiver according to claim 1, further comprising:
time-domain-channel-characteristic estimating means for subjecting the result of the estimation of a time direction channel by the time-direction-channel estimating means to Inverse Fast Fourier Transform (IFFT) and estimating a channel characteristic in a time domain; and
guard adaptive matched filter that applies detection of a correlation of data in a guard interval period to an OFDM time domain signal received by the OFDM-signal receiving means, wherein
the judging means judges a result of the estimation of a time direction channel by comparing a result of the estimation by the time-domain-channel-characteristic estimating means with a result of the detection by the guard adaptive matched filter.

4. An OFDM receiver according to claim 1, further comprising:
time-domain-channel-characteristic estimating means for subjecting the result of the estimation of a time direction channel by the time-direction-channel estimating means to Inverse Fast Fourier Transform (IFFT) and estimating a channel characteristic in a time domain;
guard adaptive matched filter that applies detection of a correlation of data in a guard interval period to an OFDM time domain signal received by the OFDM-signal receiving means; and
guard-interval-correlation arithmetic means for applying detection of a correlation in a guard interval period to an OFDM time domain signal received by the OFDM-signal receiving means, wherein
the judging means judges a result of the estimation of a time direction channel by comparing a result of the detection by the guard adaptive matched filter and a result of the detection by the guard-interval-correlation arithmetic means with a result of the estimation by the time-domain-channel-characteristic estimating means while switching the detection results.

5. An OFDM signal receiving method for use with an OFDM receiver of receiving an orthogonal frequency division multiplexing (OFDM) signal, estimating a channel characteristic using pilot signals in an OFDM frequency domain signal obtained by subjecting a received OFDM time domain signal to Fast Fourier Transform (FFT), and applying, on the basis of the estimated channel characteristic, processing for compensating for transmission distortion to the OFDM frequency domain signal subjected to the Fast Fourier Transform, the OFDM signal receiving method comprising:
judging a result of the estimation of a time direction channel used for the estimation of a channel characteristic by use of a judging circuit of the OFDM receiver;
switching presence or absence of estimation of a time direction channel in the estimation of a channel characteristic in accordance with a result of the judgment by use of a selector of the OFDM receiver; and
applying, on the basis of the estimated channel characteristic, processing for compensating for transmission distortion to the received. OFDM frequency domain signal subjected to the Fast Fourier Transform.

6. An OFDM receiver comprising:
OFDM-signal receiving means for receiving an orthogonal frequency division multiplexing signal;
channel-characteristic estimating means for estimating a channel characteristic using pilot signals in an OFDM frequency domain signal obtained by subjecting an OFDM time-domain signal received by the OFDM-signal receiving means to Fast Fourier Transform (FFT);
time-direction-channel estimating means used for the estimation of a channel characteristic in the channel-characteristic estimating means;
judging means for judging a result of the estimation of a time direction channel by the time-direction-channel estimating means;
time-domain-channel-characteristic estimating means for subjecting the result of the estimation of a time direction channel by the time-direction-channel estimating means to Inverse Fast Fourier Transform (IFFT) and estimating a channel characteristic in a time domain;
FFT-window regenerating means for performing FFT window regeneration for designating an arithmetic operation range of the Fast Fourier Transform according to the time domain channel characteristic estimated by the time-domain-channel-characteristic estimating means; and
transmission-distortion compensating means for applying, on the basis of the channel characteristic estimated by the channel-characteristic estimating means, processing for compensating for transmission distortion to the OFDM frequency domain signal received by the OFDM-signal receiving means and subjected to the Fast Fourier Transform, wherein
the FFT-window regenerating means shifts a path presence position for the estimation of a channel characteristic in the time domain by constant times of $\frac{1}{12}$ of an effective symbol length in accordance with a result of the judgment on the result of the estimation of a time direction channel by the judging means.

7. An OFDM receiver according to claim 6, further comprising guard-interval-correlation arithmetic means for applying detection of a correlation in a guard interval period to an OFDM time domain signal received by the OFDM-signal receiving means, wherein
the judging means judges a result of the estimation of a time direction channel by comparing a result of the estimation by the time-domain-channel-characteristic estimating means with a result of an arithmetic operation by the guard-interval-correlation arithmetic means.

8. An OFDM receiver according to claim 6, further comprising guard adaptive matched filter that applies detection of a correlation of data in a guard interval period to an OFDM time domain signal received by the OFDM-signal receiving means, wherein
the judging means judges a result of the estimation of a time direction channel by comparing a result of the estimation by the time-domain-channel-characteristic estimating means with a result of the detection by the guard adaptive matched filter.

9. An OFDM receiver according to claim 6, further comprising:
    guard adaptive matched filter that applies detection of a correlation of data in a guard interval period to an OFDM time domain signal received by the OFDM-signal receiving means; and
    guard-interval-correlation arithmetic means for applying detection of a correlation in a guard interval period to an OFDM time domain signal received by the OFDM-signal receiving means, wherein
    the judging means judges a result of the estimation of a time direction channel by comparing a result of the detection by the guard adaptive matched filter and a result of the detection by the guard-interval-correlation arithmetic means with a result of the estimation by the time-domain-channel-characteristic estimating means while switching the detection results.

10. An OFDM signal receiving method for use with an OFDM receiver of receiving an orthogonal frequency division multiplexing (OFDM) signal, estimating a channel characteristic using pilot signals in an OFDM frequency domain signal obtained by subjecting a received OFDM time domain signal to Fast Fourier Transform (FFT), and applying, on the basis of the estimated channel characteristic, processing for compensating for transmission distortion to the OFDM frequency domain signal subjected to the Fast Fourier Transform, the OFDM signal receiving method comprising:
    estimating a channel in a time direction using pilot signals in the OFDM frequency domain signal;
    subjecting a result of the estimation of a time direction channel to Inverse Fast Fourier Transform (IFFT) and estimating a channel characteristic in a time domain;
    judging the result of the estimation of a time direction channel used for the estimation of a channel characteristic by use of a judging circuit of the OFDM receiver;
    performing FFT window regeneration for designating an arithmetic operation range of the Fast Fourier Transform according to the characteristic of the channel in the time domain; and
    shifting a path presence position for the estimation of a channel characteristic in the time domain by constant times of $1/12$ of an effective symbol length in accordance with a result of the judgment on the result of the estimation of a time direction channel.

11. An OFDM receiver comprising:
    OFDM-signal receiving means for receiving an orthogonal frequency division multiplexing signal;
    channel-characteristic estimating means for estimating a channel characteristic using pilot signals in an OFDM frequency domain signal obtained by subjecting an OFDM time domain signal received by the OFDM-signal receiving means to Fast Fourier Transform (FFT);
    time-direction-channel estimating means used for the estimation of a channel characteristic in the channel-characteristic estimating means;
    judging means for judging a result of the estimation of a time direction channel by the time-direction-channel estimating means;
    switching control means for switching presence or absence of the estimation of a time direction channel by the time-direction-channel estimating means in the channel-characteristic estimating means in accordance with a result of the judgment on the result of the estimation of a time direction channel by the judging means;
    time-domain-channel-characteristic estimating means for subjecting the result of the estimation of a time direction channel by the time-direction-channel estimating means to Inverse Fast Fourier Transform (IFFT) and estimating a channel characteristic in a time domain;
    FFT-window regenerating means for performing FFT window regeneration for designating an arithmetic operation range of the Fast Fourier Transform according to the time domain channel characteristic estimated by the time-domain-channel-characteristic estimating means; and
    transmission-distortion compensating means for applying, on the basis of the channel characteristic estimated by the channel-characteristic estimating means, processing for compensating for transmission distortion to the OFDM frequency domain signal received by the OFDM-signal receiving means and subjected to the Fast Fourier Transform, wherein
    the switching control means switches presence or absence of the estimation of a time direction channel by the time-direction-channel estimating means in the channel-characteristic estimating means in accordance with the result of the judgment on the result of the estimation of a time direction channel by the judging means, and
    the FFT-window regenerating means shifts a path presence position for the estimation of a channel characteristic in the time domain by constant times of $1/12$ of an effective symbol length.

12. An OFDM receiver according to claim 11, further comprising guard-interval-correlation arithmetic means for applying detection of a correlation in a guard interval period to an OFDM time domain signal received by the OFDM-signal receiving means, wherein
    the judging means judges a result of the estimation of a time direction channel by comparing a result of the estimation by the time-domain-channel-characteristic estimating means with a result of an arithmetic operation by the guard-interval-correlation arithmetic means.

13. An OFDM receiver according to claim 11, further comprising guard adaptive matched filter that applies detection of a correlation of data in a guard interval period to an OFDM time domain, signal received by the OFDM-signal receiving means, wherein
    the judging means judges a result of the estimation of a time direction channel by comparing a result of the estimation by the time-domain-channel-characteristic estimating means with a result of the detection by the guard adaptive matched filter.

14. An OFDM receiver according to claim 11, further comprising:
    guard adaptive matched filter that applies detection of a correlation of data in a guard interval period to an OFDM time domain signal received by the OFDM-signal receiving means; and
    guard-interval-correlation arithmetic means for applying detection of a correlation in a guard interval period to an OFDM time domain signal received by the OFDM-signal receiving means, wherein
    the judging means judges a result of the estimation of a time direction channel by comparing a result of the detection by the guard adaptive matched filter and a result of the detection by the guard-interval-correlation arithmetic means with a result of the estimation by the time-domain-channel-characteristic estimating means while switching the detection results.

15. An OFDM signal receiving method for use with an OFDM receiver of receiving an orthogonal frequency division multiplexing (OFDM) signal, estimating a channel characteristic using pilot signals in an OFDM frequency domain signal obtained by subjecting a received OFDM time domain signal to Fast Fourier Transform (FFT), and applying, on the basis of the estimated channel characteristic, processing for compensating for transmission distortion to the OFDM frequency domain signal subjected to the Fast Fourier Transform, the OFDM signal receiving method comprising:
  estimating a channel in a time direction using pilot signals in the OFDM frequency domain signal;
  subjecting a result of the estimation of a time direction channel to Inverse Fast Fourier Transform (IFFT) and estimating a channel characteristic in a time domain;
  judging the result of the estimation of a time direction channel used for the estimation of a channel characteristic by use of a judging circuit of the OFDM receiver;
  switching presence or absence of the estimation of a time direction channel in the estimation of a channel characteristic in accordance with a result of the judgment;
  performing FFT window regeneration for designating an arithmetic operation range of the Fast Fourier Transform according to the characteristic of the channel in the time domain; and
  shifting a path presence position for the estimation of a channel characteristic in the time domain by constant times of $1/12$ of an effective symbol length in accordance with a result of the judgment on the result of the estimation of a time direction channel.

16. An OFDM receiver comprising:
  an OFDM-signal receiving unit receiving an orthogonal frequency division multiplexing signal;
  a channel-characteristic estimating unit estimating a channel characteristic using pilot signals in an OFDM frequency domain signal obtained by subjecting an OFDM time domain signal received by the OFDM-signal receiving unit to Fast Fourier Transform (FFT);
  a time-direction-channel estimating unit used for the estimation of a channel characteristic in the channel-characteristic estimating unit;
  a judging unit judging a result of the estimation of a time direction channel by the time-direction-channel estimating unit;
  a switching control unit switching presence or absence of the estimation of a time direction channel by the time-direction-channel estimating unit in the channel-characteristic estimating unit in accordance with a result of the judgment on the result of the estimation of a time direction channel by the judging unit; and
  a transmission-distortion compensating unit applying, on the basis of the channel characteristic estimated by the channel-characteristic estimating unit, processing for compensating for transmission distortion to the OFDM frequency domain signal received by the OFDM-signal receiving unit and subjected to the Fast Fourier Transform.

17. An OFDM receiver comprising:
  an OFDM-signal receiving unit receiving an orthogonal frequency division multiplexing signal;
  a channel-characteristic estimating unit estimating a channel characteristic using pilot signals in an OFDM frequency domain signal obtained by subjecting an OFDM time domain signal received by the OFDM-signal receiving unit to Fast Fourier Transform (FFT);
  a time-direction-channel estimating unit used for the estimation of a channel characteristic in the channel-characteristic estimating unit;
  a judging unit judging a result of the estimation of a time direction channel by the time-direction-channel estimating unit;
  a time-domain-channel-characteristic estimating unit subjecting the result of the estimation of a time direction channel by the time-direction-channel estimating unit to Inverse Fast Fourier Transform (IFFT) and estimating a channel characteristic in a time domain;
  an FFT-window regenerating unit performing FFT window regeneration for designating an arithmetic operation range of the Fast Fourier Transform according to the time domain channel characteristic estimated by the time-domain-channel-characteristic estimating unit; and
  a transmission-distortion compensating unit applying, on the basis of the channel characteristic estimated by the channel-characteristic estimating unit, processing for compensating for transmission distortion to the OFDM frequency domain signal received by the OFDM-signal receiving unit and subjected to the Fast Fourier Transform, wherein
  the FFT-window regenerating unit shifts a path presence position for the estimation of a channel characteristic in the time domain by constant times of $1/12$ of an effective symbol length in accordance with a result of the judgment on the result of the estimation of a time direction channel by the judging unit.

18. An OFDM receiver comprising:
  an OFDM-signal receiving unit receiving an orthogonal frequency division multiplexing signal;
  a channel-characteristic estimating unit estimating a channel characteristic using pilot signals in an OFDM frequency domain signal obtained by subjecting an OFDM time domain signal received by the OFDM-signal receiving unit to Fast Fourier Transform (FFT);
  a time-direction-channel estimating unit used for the estimation of a channel characteristic in the channel-characteristic estimating unit;
  a judging unit judging a result of the estimation of a time direction channel by the time-direction-channel estimating unit;
  a switching control unit switching presence or absence of the estimation of a time direction channel by the time-direction-channel estimating unit in the channel characteristic estimating unit in accordance with a result of the judgment on the result of the estimation of a time direction channel by the judging unit;
  a time-domain-channel-characteristic estimating unit subjecting the result of the estimation of a time direction channel by the time-direction-channel estimating unit to Inverse Fast Fourier Transform (IFFT) and estimating a channel characteristic in a time domain;
  an FFT-window regenerating unit performing FFT window regeneration for designating an arithmetic operation range of the Fast Fourier Transform according to the time domain channel characteristic estimated by the time-domain-channel-characteristic estimating unit; and a transmission-distortion compensating unit applying, on the basis of the channel characteristic estimated by the channel-characteristic estimating unit, processing for compensating for transmission distortion to the OFDM frequency domain signal received by the OFDM-signal receiving unit and subjected to the Fast Fourier Transform, wherein the switching control unit switches presence or absence of the estimation of a time direction channel by the time-direction-channel estimating unit in the channel-characteristic estimating unit in accordance with the result of the judgment on the result of the estimation of a time direction channel by the judging unit, and the FFT-window regenerating unit shifts a path presence position for the estimation of a channel characteristic in the time domain by constant times of $\frac{1}{12}$ of an effective symbol length.

* * * * *